(12) United States Patent
Doh

(10) Patent No.: US 11,397,740 B2
(45) Date of Patent: Jul. 26, 2022

(54) METHOD AND APPARATUS FOR PROVIDING INFORMATION BY USING DEGREE OF ASSOCIATION BETWEEN RESERVED WORD AND ATTRIBUTE LANGUAGE

(71) Applicant: MYCELEBS CO., LTD., Seoul (KR)

(72) Inventor: Jun Woong Doh, Seoul (KR)

(73) Assignee: MYCELEBS CO., LTD., Seoul (KR)

( * ) Notice: Subject to any disclaimer, the term of this patent is extended or adjusted under 35 U.S.C. 154(b) by 888 days.

(21) Appl. No.: 16/044,275

(22) Filed: Jul. 24, 2018

(65) Prior Publication Data

US 2019/0026361 A1    Jan. 24, 2019

Related U.S. Application Data

(63) Continuation of application No. PCT/KR2017/007964, filed on Jul. 24, 2017.

(30) Foreign Application Priority Data

| Aug. 7, 2017 | (KR) | 10-2017-0099828 |
| Sep. 20, 2017 | (KR) | 10-2017-0121289 |
| Mar. 22, 2018 | (KR) | 10-2018-0033093 |

(51) Int. Cl.
  *G06F 16/2457*  (2019.01)
  *G06F 16/33*  (2019.01)
  (Continued)

(52) U.S. Cl.
  CPC ...... *G06F 16/24578* (2019.01); *G06F 16/248* (2019.01); *G06F 16/285* (2019.01);
  (Continued)

(58) Field of Classification Search
  CPC .. G06F 16/24578; G06F 16/285; G06F 16/93; G06F 16/313; G06F 16/3344; G06F 16/338; G06F 16/951; G06F 16/248
  See application file for complete search history.

(56) References Cited

U.S. PATENT DOCUMENTS

| 2009/0125371 A1* | 5/2009 | Neylon ................. G06F 16/313 |
| | | 707/739 |
| 2013/0246447 A1* | 9/2013 | Wickramasuriya ... G06F 16/285 |
| | | 707/758 |

(Continued)

FOREIGN PATENT DOCUMENTS

| JP | 2000155758 A | 6/2000 |
| JP | 2002222208 A | 8/2002 |

(Continued)

*Primary Examiner* — Kannan Shanmugasundaram
(74) *Attorney, Agent, or Firm* — Nath, Goldberg & Meyer; Gregory B. Kang; Stanley N. Protigal

(57) ABSTRACT

Disclosed herein are a method and apparatus for providing information by using an attribute language. The method includes: extracting a representative attribute keyword candidate set including representative attribute keywords; setting a reserved word set including reserved words; storing the degrees of object-keyword association corresponding to object item-representative attribute keyword pairs; storing the degrees of basic reserved word-keyword association corresponding to reserved word-representative attribute keyword pairs by using association weights corresponding to representative attribute keyword-subordinate keyword pairs and the degrees of basic reserved word-subordinate keyword association corresponding to reserved word-subordinate keyword pairs; acquiring a received reserved word; acquiring the degree of reserved word-object association corresponding to a pair of the received reserved word and each object item by using the degrees of object-keyword association and the degrees of basic reserved word-keyword (Continued)

association; and providing an object item based on the degree of reserved word-object association.

9 Claims, 16 Drawing Sheets

(51) Int. Cl.
*G06F 16/28* (2019.01)
*G06F 16/248* (2019.01)
*G06F 16/338* (2019.01)
*G06F 16/93* (2019.01)
*G06F 16/31* (2019.01)
*G06F 16/951* (2019.01)

(52) U.S. Cl.
CPC .......... *G06F 16/313* (2019.01); *G06F 16/338* (2019.01); *G06F 16/3344* (2019.01); *G06F 16/93* (2019.01); *G06F 16/951* (2019.01)

(56) References Cited

U.S. PATENT DOCUMENTS

2013/0311485 A1* 11/2013 Khan ................... G06F 16/335
707/748
2015/0142780 A1 5/2015 Oh et al.

FOREIGN PATENT DOCUMENTS

| | | |
|---|---|---|
| JP | 2003150528 A | 5/2003 |
| JP | 2009140306 A | 6/2009 |
| KR | 1020040063641 A | 7/2004 |
| KR | 1020070112344 A | 11/2007 |
| KR | 20090078701 A | 7/2009 |
| KR | 1020100068532 A | 6/2010 |
| KR | 10-1099154 B1 | 12/2011 |
| KR | 10-1417894 B1 | 7/2014 |
| KR | 1020150059208 A | 6/2015 |
| KR | 20150105753 A | 9/2015 |
| KR | 20170089364 A | 8/2017 |
| WO | 2013047471 A1 | 4/2013 |

* cited by examiner

FIG. 10

|  | $k_1$ | $k_2$ | $k_3$ | $k_4$ | $k_5$ | $k_6$ | ... | $k_n$ |
|---|---|---|---|---|---|---|---|---|
| $i_1$ | $w_{1,1}$ | $w_{1,2}$ | $w_{1,3}$ | $w_{1,4}$ | $w_{1,5}$ | $w_{1,6}$ | ... | $w_{1,n}$ |
| $i_2$ | $w_{2,1}$ | $w_{2,2}$ | $w_{2,3}$ | $w_{2,4}$ | $w_{2,5}$ | $w_{2,6}$ | ... | $w_{2,n}$ |
| $i_3$ | $w_{3,1}$ | $w_{3,2}$ | $w_{3,3}$ | $w_{3,4}$ | $w_{3,5}$ | $w_{3,6}$ | ... | $w_{3,n}$ |
| $i_4$ | $w_{4,1}$ | $w_{4,2}$ | $w_{4,3}$ | $w_{4,4}$ | $w_{4,5}$ | $w_{4,6}$ | ... | $w_{4,n}$ |
| $i_5$ | $w_{5,1}$ | $w_{5,2}$ | $w_{5,3}$ | $w_{5,4}$ | $w_{5,5}$ | $w_{5,6}$ | ... | $w_{5,n}$ |
| $i_6$ | $w_{6,1}$ | $w_{6,2}$ | $w_{6,3}$ | $w_{6,4}$ | $w_{6,5}$ | $w_{6,6}$ | ... | $w_{6,n}$ |
| ... | ... | ... | ... | ... | ... | ... | ... | ... |
| $i_m$ | $w_{m,1}$ | $w_{m,2}$ | $w_{m,3}$ | $w_{m,4}$ | $w_{m,5}$ | $w_{m,6}$ | ... | $w_{m,n}$ |

FIG. 11

|  | $C_1$ | $C_2$ | $C_3$ | $C_4$ | $C_5$ | $C_6$ | ... | $C_q$ |
|---|---|---|---|---|---|---|---|---|
| $k_1$ | $v_{1,1}$ | $v_{1,2}$ | $v_{1,3}$ | $v_{1,4}$ | $v_{1,5}$ | $v_{1,6}$ | ... | $v_{1,q}$ |
| $k_2$ | $v_{2,1}$ | $v_{2,2}$ | $v_{2,3}$ | $v_{2,4}$ | $v_{2,5}$ | $v_{2,6}$ | ... | $v_{2,q}$ |
| $k_3$ | $v_{3,1}$ | $v_{3,2}$ | $v_{3,3}$ | $v_{3,4}$ | $v_{3,5}$ | $v_{3,6}$ | ... | $v_{3,q}$ |
| $k_4$ | $v_{4,1}$ | $v_{4,2}$ | $v_{4,3}$ | $v_{4,4}$ | $v_{4,5}$ | $v_{4,6}$ | ... | $v_{4,q}$ |
| $k_5$ | $v_{5,1}$ | $v_{5,2}$ | $v_{5,3}$ | $v_{5,4}$ | $v_{5,5}$ | $v_{5,6}$ | ... | $v_{5,q}$ |
| $k_6$ | $v_{6,1}$ | $v_{6,2}$ | $v_{6,3}$ | $v_{6,4}$ | $v_{6,5}$ | $v_{6,6}$ | ... | $v_{6,q}$ |
| ... | ... | ... | ... | ... | ... | ... | ... | ... |
| $k_n$ | $v_{n,1}$ | $v_{n,2}$ | $v_{n,3}$ | $v_{n,4}$ | $v_{n,5}$ | $v_{n,6}$ | ... | $v_{n,q}$ |

METHOD AND APPARATUS FOR PROVIDING INFORMATION BY USING DEGREE OF ASSOCIATION BETWEEN RESERVED WORD AND ATTRIBUTE LANGUAGE

CROSS-REFERENCE TO RELATED APPLICATION

This application claims priority under 35 U.S.C. § 119 to Korean Patent Application No. 10-2017-0099828 filed on Aug. 7, 2017, Korean Patent Application No. 10-2017-0121289 filed on Sep. 20, 2017, PCT/KR2017/007964 filed on Jul. 24, 2017 and Korean Patent Application No. 10-2018-0033093 filed on Mar. 22, 2018, in the Korean Intellectual Property Office (KIPO), the disclosure of which is incorporated by reference herein in its entirety.

1. TECHNICAL FIELD

At least some exemplary embodiments of the present disclosure relate to a method and apparatus for providing information by using the degree of association between a reserved word and an attribute language.

2. DISCUSSION OF RELATED ART

According to conventional search methods, a user can search for a desired web document or the like by entering a search keyword into a search box. For example, a user may retrieve information about the movie "Interstellar" by entering the title of the movie "Interstellar" into the search box. However, if a user cannot remember the title of a movie which he or she desires to search for, he or she needs to provide another type of information. For example, a user may attempt a search by entering an actor, director, producer, or the like of a movie which he or she desires to search for. There are many cases where movie information sites and movie review sites provide cast information as well as movie information, and thus the user can search for a desired movie by using an actor, a director, a producer, or the like as a keyword unless he or she is unlucky.

Meanwhile, the conventional search methods cannot be used if information to be used is information based on an a typical language, for example, an emotional language, rather than typical information. For example, responses provided by conventional search engines for a search term, such as "a funny movie" or "a movie which is viewed when a viewer is sad," are merely search results, including documents which have been written to include the keyword "a funny movie" or "a movie viewed when a viewer is sad." However, an a typical language requires an approach different from that for typical information, such as a starring actor, a (typical) movie genre, and a year of release. Even if documents have not been written to include the keyword "a funny movie" or "a movie viewed when a viewer is sad," there could be a lot of movies for which many people might feel is "fun" or "sad." Furthermore, for other fields than film, a different approach may be required for requesting information by using an a typical language.

SUMMARY

At least some exemplary embodiments of the present disclosure are directed to a method and apparatus for efficiently providing information by using a reserved word.

According to an exemplary embodiment of the present disclosure, there is provided a method of providing information, the method including: extracting a representative attribute keyword candidate set including representative attribute keywords; setting a reserved word set including reserved words; storing the degrees of object-keyword association corresponding to object item-representative attribute keyword pairs; storing the degrees of basic reserved word-keyword association corresponding to reserved word-representative attribute keyword pairs by using association weights corresponding to representative attribute keyword-subordinate keyword pairs and the degrees of basic reserved word-subordinate keyword association corresponding to reserved word-subordinate keyword pairs; acquiring a received reserved word; acquiring the degree of reserved word-object association corresponding to a pair of the received reserved word and each object item by using the degrees of object-keyword association and the degrees of basic reserved word-keyword association; and providing an object item based on the degree of reserved word-object association corresponding to the pair of the received reserved word and each object item.

According to an exemplary embodiment of the present disclosure, there is provided an apparatus for providing information, the apparatus including: a control unit configured to extract a representative attribute keyword candidate set including representative attribute keywords, to set a reserved word set including reserved words, store the degrees of object-keyword association corresponding to object item-representative attribute keyword pairs, and to store the degrees of basic reserved word-keyword association corresponding to reserved word-representative attribute keyword pairs by using association weights corresponding to representative attribute keyword-subordinate keyword pairs and the degrees of basic reserved word-subordinate keyword association corresponding to reserved word-subordinate keyword pairs; a storage unit configured to store the degrees of object-keyword association and the degrees of basic reserved word-keyword association; and a communication unit configured to acquire a received reserved word. The control unit acquires the degree of reserved word-object association corresponding to a pair of the received reserved word and each object item by using the degrees of object-keyword association and the degrees of basic reserved word-keyword association. The control unit provides an object item based on the degree of reserved word-object association corresponding to the pair of the received reserved word and each object item.

BRIEF DESCRIPTION OF THE DRAWINGS

A more complete appreciation of the present invention will become more apparent by describing in detail exemplary embodiments thereof with reference to the accompanying drawings, wherein:

FIG. 10 shows an example of the stored degrees of object-keyword association according to an exemplary embodiment of the present disclosure;

FIG. 11 shows an example of the degrees of basic reserved word-keyword association according to an exemplary embodiment of the present disclosure;

DETAILED DESCRIPTION

Exemplary embodiments of the present disclosure will be described in detail below with reference to the accompanying drawings.

In the descriptions of the embodiments, descriptions of techniques which are well known in the art to which this disclosure belongs and which are not directly related to this disclosure will be omitted. The reason for this is to more clearly convey the gist of the present disclosure without making the gist of the present disclosure obscure by omitting unnecessary descriptions.

For the same reason, in the accompanying drawings, some components are exaggerated, omitted, or schematically shown. Also, the size of each component does not completely reflect the actual size thereof. Throughout the drawings, the same or corresponding components are denoted by the same reference symbols.

The exemplary embodiments of the present disclosure are described in detail below with reference to the accompanying drawings.

Figure 1:
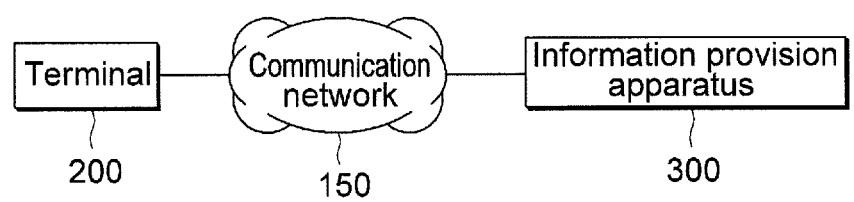
FIG. 1 is a view showing the network configuration of a system for providing information by using an attribute language according to an exemplary embodiment of the present disclosure.

FIG. 1 is a view showing the network configuration of a system for providing information by using an attribute language according to an exemplary embodiment of the present disclosure.

Referring to FIG. 1, the information provision system according to the present exemplary embodiment may include a terminal 200, an information provision apparatus 300, and a communication network 150.

Terminal 200 may be implemented as, e.g., a smartphone, a PDA, a tablet PC, a notebook computer, a laptop computer, a personal computer, another electronic device capable of performing communication, receiving input from a user, and outputting screens, or a similar device.

The information provision apparatus 300 may be implemented as, e.g., a workstation, a server, a general-purpose computer, another electronic device capable of performing communication, or a similar device.

The terminal 200 and the information provision apparatus 300 are connected to and communicate with each other over the communication network 150.

The communication network 150 may be implemented using at least part of Long Term Evolution (LTE), LTE-Advanced (LTE-A), WI-FI, Local Area Network (LAN), Wide Area Network (WAN), Code Division Multiple Access (CDMA), Time Division Multiple Access (TDMA), Wireless Broadband (WiBro), and Global System for Mobile Communications (GSM), and other communication methods developed in the past, being currently developed, and to be developed in the future. In the following, for the sake of convenience, the terminal 200 and the information provision apparatus 300 will be described as directly communicating with each other without references to the communication network 150.

The detailed operations and configurations of the terminal 200 and the information provision apparatus 300 will be described with reference to FIGS. 2 to 8.

Figure 2:
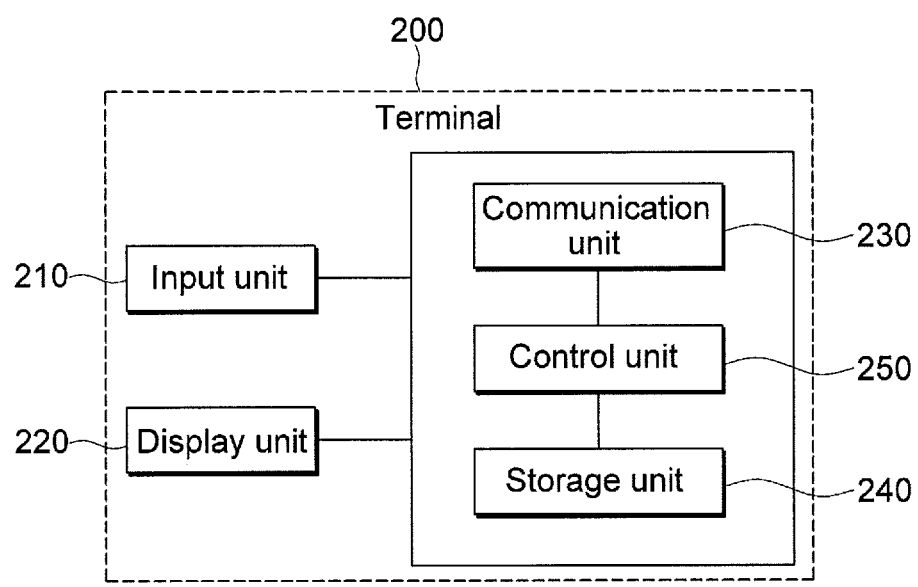
FIG. 2 is a block diagram of a terminal according to an exemplary embodiment of the present disclosure.

FIG. 2 is a block diagram of a terminal 200 according to an exemplary embodiment of the present disclosure.

Referring to FIG. 2, the terminal 200 according to the present exemplary embodiment may include an input unit 210, a display unit 220, a communication unit 230, a storage unit 240, and a control unit 250.

The input unit 210 converts an input operation of a user into an input signal, and transmits the input signal to the control unit 250. The input unit 210 may be implemented as, e.g., a keyboard, a mouse, a touch sensor on a touch screen, a touchpad, a keypad, a voice input device, or another input processing device developed in the past, being currently developed, or to be developed in the future. For example, the input unit 210 may receive information provision request input from a user, and may transfer the information provision request input to the control unit 250.

The display unit 220 outputs a screen under the control of the control unit 250. The display unit 220 may be implemented as, e.g., a liquid crystal display (LCD) device, a light-emitting diode (LED) device, an organic LED (OLED) device, a projector, or another display device developed in the past, being currently developed, or to be developed in the future. For example, the display unit 220 may display an interface page or information provision result page for the provision of information. In an exemplary embodiment, a component using another method capable of transferring information to a user, such as voice output or vibration, rather than screen output, may be used in place of the display unit 220.

The communication unit 230 exchanges data with the information provision apparatus 300 and/or other external devices. The communication unit 230 transfers data, received from the information provision apparatus 300, to the control unit 250. Furthermore, the communication unit 230 transfers data to the information provision apparatus 300 under the control of the control unit 250. The communication technology used by the communication unit 230 may vary depending on the type of communication network 150 or other circumstances.

The storage unit 240 stores data under the control of the control unit 250, and transfers requested data to the control unit 250.

The control unit 250 controls the overall operation of the terminal 200 and individual components. In particular, the control unit 250 transmits an information provision request or another type of data to the information provision apparatus 300 according to information input from the input unit 210, and displays a result page and/or an interface page via the display unit 220 according to page information received from the information provision apparatus 300, as will be described later.

The operation performed by the control unit 250 may be distributed and processed by a plurality of arithmetic and logic units which are physically distributed. There is possible a method in which part of the operation performed by the control unit 250 is performed by a first server and the remaining operation is performed by a second server. In this case, the control unit 250 may be implemented as the sum of the arithmetic and logic units which are physically distributed.

The storage unit 240 may be implemented as the sum of storage devices which are physically separated from each other.

When the control unit 250 or storage unit 240 is implemented as the sum of a plurality of devices which are physically separated from each other, communication is required between the plurality of devices. In this case, for the sake of simplicity of description, the following description will be given on the assumption that the storage unit 240 or control unit 250 is implemented as a single object.

In the case where the terminal 200 transmits or receives data, the communication unit 230 may be described as transmitting or receiving data under the control of the control unit 250, or the control unit 250 may be described as transmitting or receiving data by controlling the communication unit 230, depending on the point of view of a corresponding situation.

The detailed operations of the individual components of the terminal 200 will be described with reference to FIGS. 4 to 8.

Figure 3:
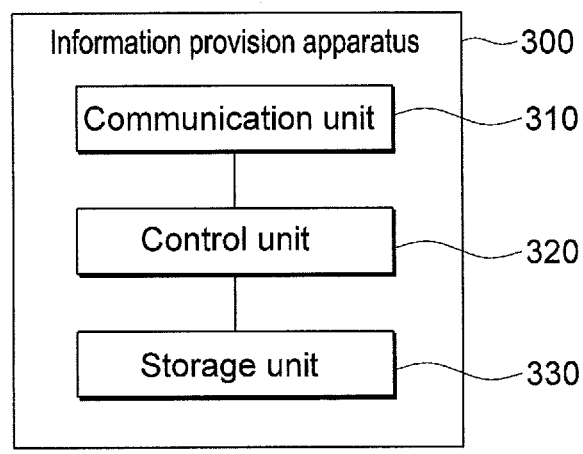
FIG. 3 is a block diagram of an information provision apparatus according to an exemplary embodiment of the present disclosure.

FIG. 3 is a block diagram of an information provision apparatus 300 according to an exemplary embodiment of the present disclosure.

Referring to FIG. 3, the information provision apparatus 300 according to the present exemplary embodiment may include a communication unit 310, a control unit 320, and a storage unit 330.

The communication unit 310 exchanges data with the terminal 200 and/or other external devices. The communication unit 310 transfers data, received from the terminal 200, to the control unit 320. Furthermore, the communication unit 310 transfers data to the terminal 200 under the control of the control unit 320. The communication technology used by the communication unit 310 may vary depending on the type of communication network 150 or other circumstances.

The storage unit 330 stores data under the control of the control unit 320, and transfers data, requested by the control unit 320, to the control unit 320.

The control unit 320 controls the overall operation of the information provision apparatus 300 and individual components. In particular, when the control unit 320 receives an interface page request, an information provision result page request, or another type of data via the communication unit 310, the control unit 320 retrieves required data from storage unit 330, generates load page information, and transfers page information to the terminal 200 via the communication unit 310, as will be described later.

In the case where the information provision apparatus 300 transmits or receives data, the communication unit 310 may be described as transmitting or receiving data under the control of the control unit 320, or the control unit 320 may be described as transmitting or receiving data by controlling the communication unit 310, depending on the point of view of a corresponding situation.

The detailed operations of the individual components of the information provision apparatus 300 will be described with reference to FIGS. 4 to 8.

According to another exemplary embodiment, data adapted to provide information by using a voice form or another method may be transmitted and received in place of a page adapted to visually provide information.

Figure 4:
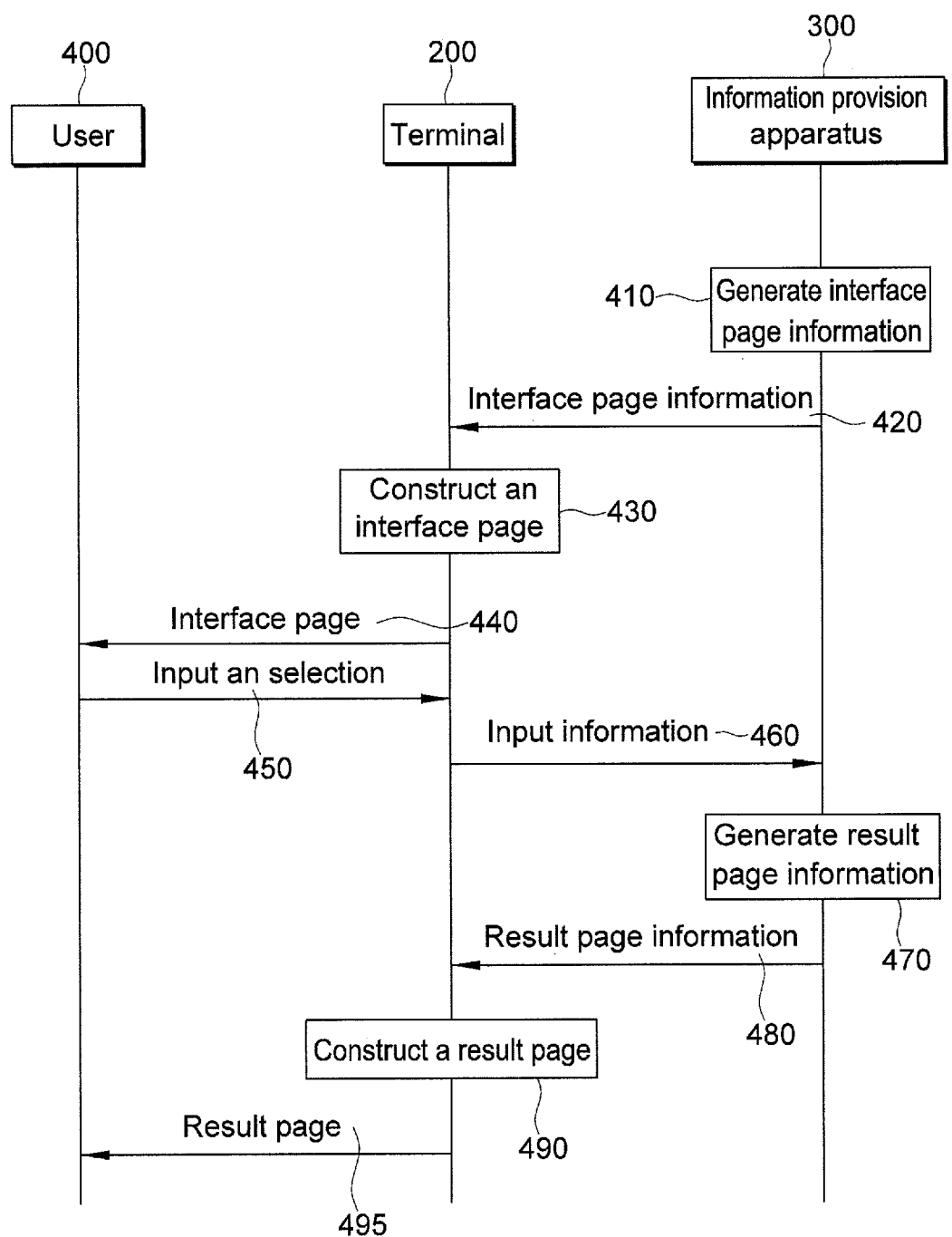
FIG. 4 is a flowchart of a process of providing information via an information provision interface according to an exemplary embodiment of the present disclosure.

FIG. 4 is a flowchart of a process of providing information via an information provision interface according to an exemplary embodiment of the present disclosure.

At step 410, the control unit 320 of the information provision apparatus 300 generates interface page information. The interface page is information required to generate an information interface page. The interface page is a page adapted to prompt the input of a user, to receive the input of the user, and to transfer the input of the user to the information provision apparatus 300. For example, the interface page information may be in the form of an HTML document or another markup language document. In another exemplary embodiment, the terminal 200 may have the form information of the interface page in advance, and only an item corresponding to content may be transferred from the information provision apparatus 300 to the terminal 200. In the following, for the sake of convenience, the following description will be given on the assumption that the interface page information or another type of page information is transferred in the form of an HTML document. However, the scope of the present disclosure is not limited thereto.

At step 420, the communication unit 310 of the information provision apparatus 300 transfers the interface page information to the terminal 200.

At step 430, the control unit 250 of the terminal 200 constructs an interface page by using the interface page information. For example, the control unit 250 may run a web browser, may interpret an HTML document, and may construct an interface page in the form of a web page. A separate application may be used in place of the web browser.

At step 440, the display unit 220 of the terminal 200 displays the interface page to a user 400. The interface page may include an interface in which, e.g., the user 400 may request the provision of information, may input and/or select a keyword for the provision of the information, and may make other settings for the provision of the information.

At step 450, the input unit 210 of the terminal 200 receives the selection input of the user 400 via the input interface page, and transfers the selection input to the control unit 250.

At step 460, the communication unit 230 of the terminal 200 transfers input information adapted to identify the selection input of the user 400 to the information provision apparatus 300 under the control of the control unit 250.

At step 470, the control unit 320 of the information provision apparatus 300 generates result page information by using the input (e.g., a keyword and/or another information provision setting) of the user 400. A preparation process of generating the result page information and a process of generating the result page information will be described with reference to FIGS. 5 to 8 later. The result page information may be constructed, e.g., in the form of an HTML document and/or in the form of an image.

At step 480, the communication unit 310 of the information provision apparatus 300 transfers the result page information to the terminal 200.

At step 490, the control unit 250 of the terminal 200 constructs a result page by using the result page information received by the communication unit 230. For example, the control unit 250 may construct a result page by interpreting the result page information in an HTML form.

At step 495, the display unit 220 of the terminal 200 provides the result page to the user 400.

Although it is assumed that a page in a visual form is provided to the user 400 in the exemplary embodiment of FIG. 4, the interface or result information may be provided by voice. In this case, a voice output unit may be used in place of the display unit 220. Another type of interface method available currently or in the future may be used in conjunction with the user 400 in place of the visual/aural method. In this case, the information provision apparatus 300 may provide information, obtained through conversion using another method, to the terminal 200 in place of the page information in accordance with the interface method.

Figure 5:
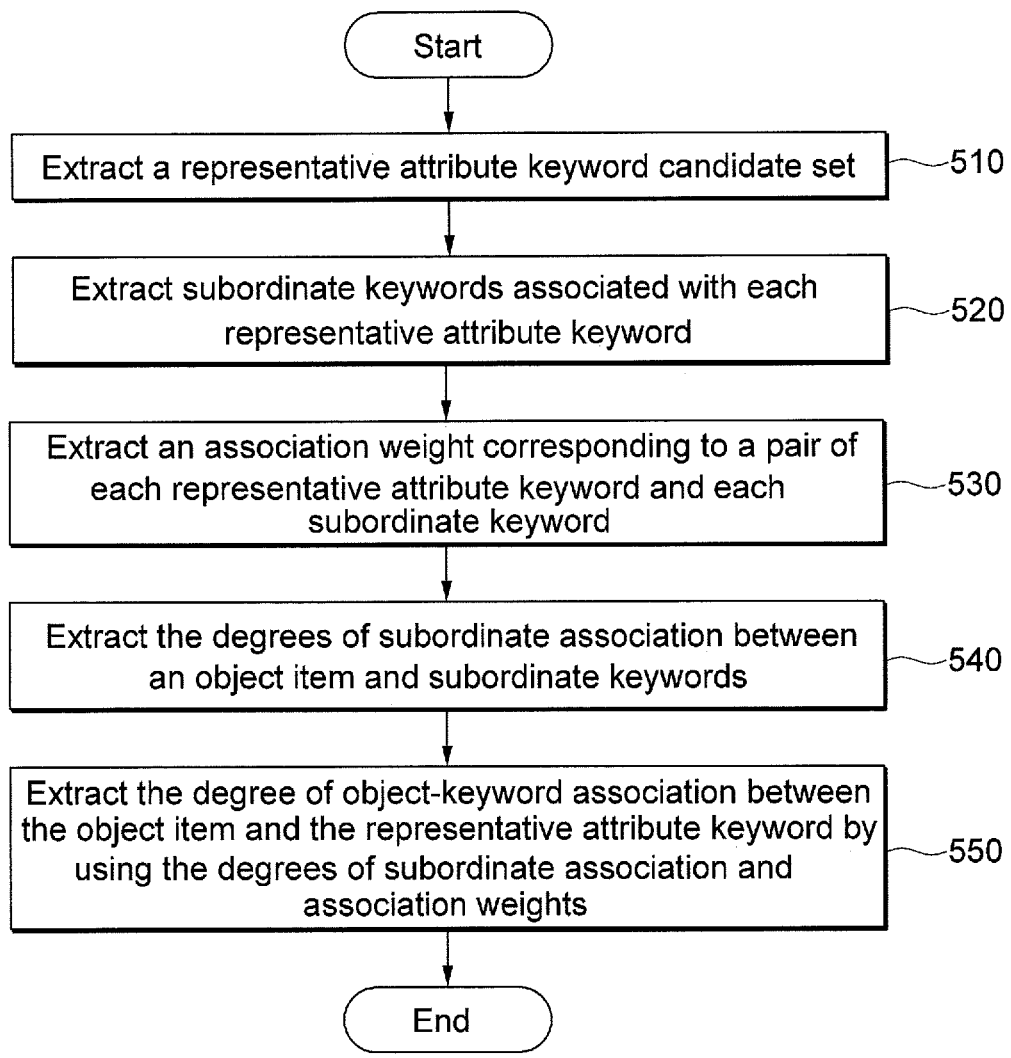
FIG. 5 is a detailed flowchart of step 910 according to an exemplary embodiment of the present disclosure.

In exemplary embodiments shown in the drawings starting from FIG. 5, the user 400 desires to receive information about an object in a specific field of interest in which he or she is interested in. However, the scope of the present disclosure is not limited thereto.

A field of interest may be, e.g., the type of objects. For example, when the field of interest is "Celebrity," objects corresponding to this field of interest may include "Si-min Yu," "Jae-seok Yu," "Taylor Swift," etc. For example, when the field of interest is "Movie," objects corresponding to this field of interest may include "Dunkirk," "Spider-Man: Homecoming," "Despicable Me 3," etc. For example, when the field of interest is "Broadcast program," objects corresponding to this field of interest may include "Muhandogeon (Infinite Challenge)," "American Idol," "Game of Thrones," etc.

In the following exemplary embodiments, documents are collected in order to evaluate the relationship (the degree of association, weight, and/or the like) between keywords. The collected documents may be evaluated as having the same value, or a newer document may be evaluated as having a higher value. In other words, the degrees of association between the age of a document based on an evaluation date and keywords appearing in the document may have a negative correlation.

In the process starting from FIG. 5, the value may vary depending on the up-to-dateness of a document. For example, the degree of association of a case where two keywords appear in a document which is one day old at evaluation time may be evaluated as being ten times higher than that of a case where two keywords appear in a document which is ten days old at the evaluation time. The age of a document may be evaluated, e.g., on a second/minute/hour basis or on a day/month/year basis. Although the control unit 320 is based on a document evaluated before the age of the document is reflected therein, the control unit 320 may extract the degree of association between two keywords by extracting the partial degree of association reflecting the age of the document through the division of the value of the partial degree of association by the age of the document and then accumulating the partial degrees of association.

The time at which a document was generated, which is used to determine the age of the document, may be determined using, e.g., a posting time included inside the document and/or metadata. Alternatively, when a document which had not been found during previous crawling is newly found through periodic crawling, it is determined that a new document is added at new crawling time.

Figure 9:
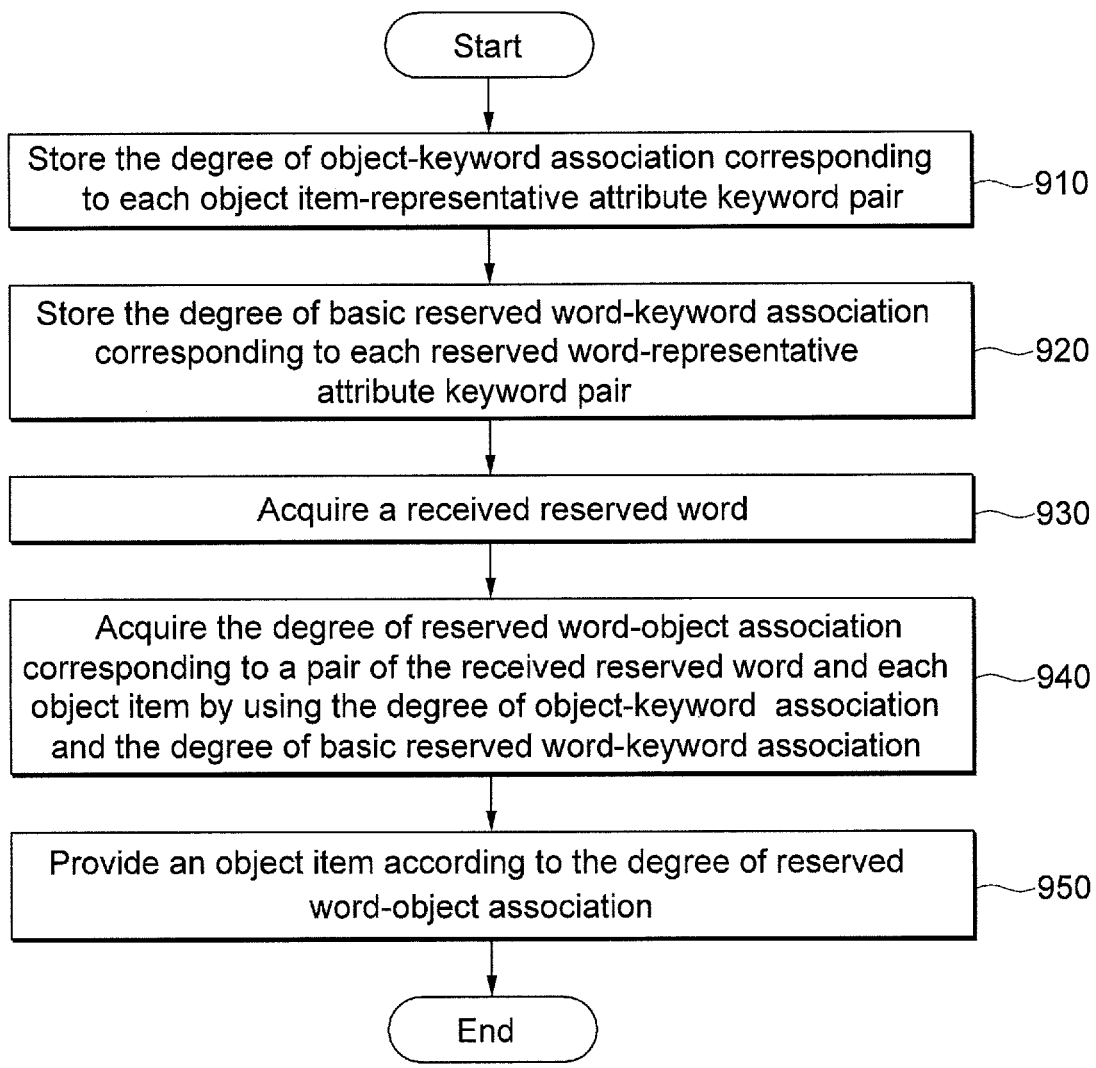
FIG. 9 is a flowchart of a process of providing information according to another exemplary embodiment of the present disclosure.

FIG. 9 is a flowchart of a process of providing information according to an exemplary embodiment of the present disclosure.

At step 910, the control unit 320 stores the degree of object-keyword association corresponding to each object item-representative attribute keyword pair in the storage unit 330.

FIG. 10 shows an example of the stored degrees of object-keyword association according to an exemplary embodiment of the present disclosure.

In the exemplary embodiment of FIG. 10, object items are all in m ($i_1$ to $i_m$) in number, and representative attribute keywords are all n ($k_1$ to $k_n$) in number.

For example, the degree of object-keyword association between the object item $i_5$ and the representative attribute keyword $k_3$ is $w_{5,3}$.

The process of step 910 may be performed, e.g., according to part of the exemplary embodiments of FIGS. 5 to 8, a similar process, or an equivalent process. According to another exemplary embodiment, the process of step 910 may be performed by the input of an administrator, or by receiving the degree of object-keyword association, determined by an external system, via a network or storage medium.

FIG. 5 is a detailed flowchart of step 910 according to an exemplary embodiment of the present disclosure.

Referring to FIG. 5, at step 510, the control unit 320 extracts a representative attribute keyword candidate set from first set documents. For example, the control unit 320 may collect keywords, frequently appearing in the documents of the first set documents corresponding to a field of interest, as a representative attribute keyword candidate set.

Figure 6:
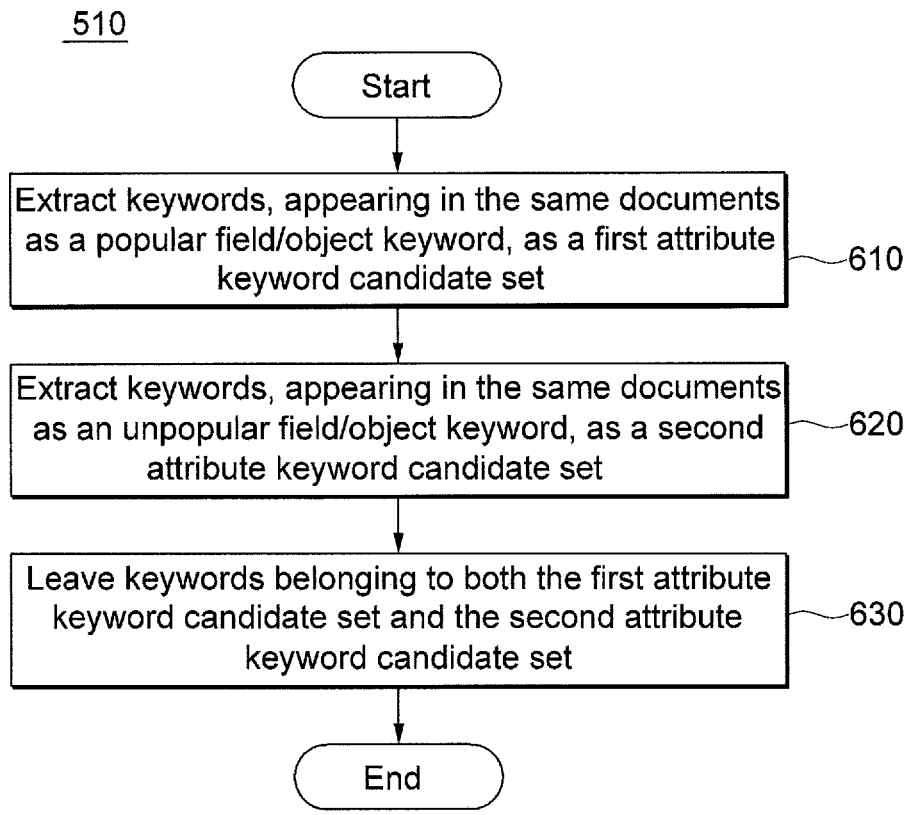
FIG. 6 is a detailed flowchart of step 510 according to an exemplary embodiment of the present disclosure.

FIG. 6 is a detailed flowchart of step 510 according to an exemplary embodiment of the present disclosure.

The control unit 320 may select keywords appearing in the same documents as object keywords representative of object items belonging to a specific field and keywords appearing in the same documents as field keywords representative of a specific field as a first attribute keyword candidate set and a second attribute keyword candidate set.

For example, when a target field of interest for the provision of information provision service is "Celebrity," field keywords may include "celebrity," "entertainer," "movie star," "star," "celeb," etc. The field keywords may be set by an administrator, and may be recommended and set by the control unit 320. The control unit 320 may acquire some field keywords, and may then recommend and set similar keywords, whose degree of association with each of the field keywords is analyzed as being equal to or larger than a preset value, as additional field keywords.

When a target field of interest for the provision of information provision service is "Celebrity," object keywords may be individual persons belonging to the corresponding field of interest. For example "Jae-seok Yu," "Taylor Swift," "Stephen Curry," etc. may be object keywords corresponding to the field of interest "Celebrity."

The relationship between a field keyword and an object keyword is now described. For example, a field keyword may correspond to the attribute or type of corresponding object keyword. A field keyword may be representative of a set, whereas an object keyword may be representative of an element belonging to a corresponding set.

Object keywords may be set by an administrator, and may be selected using a method similar to the method of selecting field keywords. According to still another exemplary embodiment, the control unit 320 may select keywords, determined to be elements of a set represented by a field keyword, as object keywords by analyzing the contexts of collected documents.

A popular object keyword and an unpopular object keyword may be distinguished from each other based on the quantities of the found/collected corresponding object keywords. The control unit 320 may search for/collect documents containing each object keyword, and may set an object keyword, for which the quantity of collected documents is equal to or larger than a specific threshold value, as a popular object keyword and set an object keyword, for which the quantity of collected documents is smaller than a specific threshold value, as an unpopular object keyword.

A popular field keyword and an unpopular field keyword may be distinguished from each other based on the quantities of the found/collected corresponding field keywords. The control unit 320 may search for/collect documents containing each field keyword, and may set a field keyword, for which the quantity of collected documents is equal to or larger than a specific threshold value, as a popular field keyword and set a field keyword, for which the quantity of collected documents is smaller than a specific threshold value, as an unpopular field keyword. However, the threshold value used to distinguish the popular object keyword and the unpopular object keyword from each other and the threshold value used to distinguish the popular field keyword and the unpopular field keyword from each other may be different values. In the following, for the sake of convenience, a popular object keyword and a popular field keyword may be collectively called a popular field/object keyword. Furthermore, for the sake of convenience, an unpopular object keyword and an unpopular field keyword may be collectively called an unpopular field/object keyword.

In a modified exemplary embodiment, only a popular field keyword or popular object keyword may be used in place of a popular field/object keyword. In a modified exemplary embodiment, only an unpopular field keyword or unpopular object keyword may be used in place of an unpopular field/object keyword.

At step 610, the control unit 320 sets keywords, appearing in the same documents as a popular field/object keyword, for a first attribute keyword candidate set.

The control unit 320 may search for/collect documents containing a popular field/object keyword, and may set keywords, included in the collected documents, for a first attribute keyword candidate set. According to another exemplary embodiment, the control unit 320 may exclude field keyword and object keywords among the keywords included in the collected documents from the first attribute keyword candidate set. Furthermore, the control unit 320 may exclude a preset insignificant keyword, e.g., a postpositional particle/article, from the first attribute keyword candidate set. Furthermore, according to another exemplary embodiment, the control unit 320 may include a keyword, registered in a preset dictionary, among the keywords included in the collected documents in a first attribute keyword candidate set.

Furthermore, according to another exemplary embodiment, the control unit 320 may search for/collect documents containing a popular field/object keyword, and may include keywords, disposed within a preset distance from a popular field/object keyword or a sentence containing the keyword in the collected documents, in a first attribute keyword candidate set. Furthermore, according to another exemplary embodiment, the control unit 320 may search for/collect documents containing a popular field/object keyword, and may include keywords, used to describe and modify the popular field/object keyword, in a first attribute keyword candidate set by analyzing the contexts of the collected documents.

The distance between keywords or the distance between a keyword and a sentence may be determined based on, e.g., any one or more of the number of sentences located between the two keywords or between the keyword and the sentence, the number of words located between the two keywords or between the keyword and the sentence, the number of phases located between the two keywords or between the keyword and the sentence, and the number of letters located between the two keywords or between the keyword and the sentence.

The control unit 320 may first perform morpheme analysis in order to perform keyword analysis.

At step 620, the control unit 320 sets keywords, appearing in the same documents as an unpopular field/object keyword, for a second attribute keyword candidate set.

The control unit 320 may search for/collect documents containing an unpopular field/object keyword, and may set keywords, included in the collected documents, for a second attribute keyword candidate set. According to another exemplary embodiment, the control unit 320 may exclude a field keyword and an object keyword among keywords included in the collected documents from the second attribute keyword candidate set. Furthermore, the control unit 320 may exclude a preset insignificant keyword, e.g., a postpositional particle/article and/or the like, from the second attribute keyword candidate set. Furthermore, according to another exemplary embodiment, the control unit 320 may include a keyword, registered in a preset dictionary, among the keywords included in the collected documents in a second attribute keyword candidate set.

Furthermore, according to another exemplary embodiment, the control unit 320 may search for/collect documents containing an unpopular field/object keyword, and may include keywords, disposed within a preset distance from an unpopular field/object keyword or a sentence containing the keyword in the collected documents, in a second attribute keyword candidate set. Furthermore, according to another exemplary embodiment, the control unit 320 may search for/collect documents containing an unpopular field/object keyword, and may include keywords, used to describe and modify the unpopular field/object keyword, in a second attribute keyword candidate set by analyzing the contexts of the collected documents.

The distance between keywords or the distance between a keyword and a sentence may be determined based on, e.g., any one or more of the number of sentences located between the two keywords or between the keyword and the sentence, the number of words located between the two keywords or between the keyword and the sentence, the number of phases located between the two keywords or between the keyword and the sentence, and the number of letters located between the two keywords or between the keyword and the sentence.

The control unit 320 may first perform morpheme analysis in order to perform keyword analysis.

At step 630, the control unit 320 may set keywords belonging to both the first attribute keyword candidate set and the second attribute keyword candidate set for a representative attribute keyword candidate set. In other words, keywords used to modify both a popular field/object keyword and an unpopular field/object keyword may be collected as the representative attribute keyword candidate set.

According to another exemplary embodiment, at step 510, the control unit 320 may include keywords each appearing along with an object keyword and/or a field keyword in the representative attribute keyword candidate set regardless of the popularity/unpopularity thereof.

Referring back to FIG. 5, at step 520, the control unit 320 extracts two or more subordinate keywords, associated with each representative attribute keyword included in the representative attribute keyword candidate set, from the second set documents.

The second set documents used for the subordinate keyword extraction of step 520 and the first set documents used for the representative attribute keyword candidate set extraction of step 510 may be different document sets, or may be the same document set. For example, the first set documents may be a set including all collectable documents, and the second set documents may be a set including only documents in which a specific target field of interest for the provision of information provision service is used as a main keyword. The control unit 320 may analyzes whether or not each document is a document in which a specific target field of interest for the provision of information provision service is used as a main keyword based on frequently appearing keywords by analyzing collectable documents. According to another exemplary embodiment, the first set documents and the second set documents may be all sets each including all collectable related documents. Furthermore, according to another exemplary embodiment, the first set documents may be a set including all collectable related documents, and the second set documents may be a set including only documents related to a specific target field of interest for the provision of information provision service. Furthermore, according to another exemplary embodiment, the second set documents may be a set including all collectable related documents, and the first set documents may be a set including only documents related to a specific target field of interest for the provision of information provision service.

For step 520, the control unit 320 may collect documents including a keyword representative of a specific target field of interest itself and/or documents each including an object keyword belonging to the corresponding field of interest, e.g., in order to generate a set including only documents related to the specific field of interest for the provision of information provision service, extracts documents in which the weight of a field keyword/object keyword is equal to or larger than a preset value, from among the collected documents, and may generate a set including only documents related to the specific field of interest. The weight of the field keyword/object keyword may be determined based on the appearing frequency or appearing locations of the field keyword/object keyword, context, or the like. For example, a document in which the field keyword/object keyword appears frequently, is used as the title of the corresponding document, or is described in large letters or emphasizing fonts may be classified as a document related to the specific field of interest.

At step 520, the control unit 320 may extract a preset number of subordinate keywords each having a high degree of association with each representative attribute keyword by, e.g., analyzing at least part of the second set documents, thereby extracting two or more subordinate keywords associated with each representative attribute keyword.

The control unit 320 may determine the degree of association between a representative attribute keyword and a subordinate keyword, e.g., by taking into account the frequency at which the subordinate keyword appears in the same or similar context as the representative attribute keyword. For example, words appearing near keyword A in a specific sentence may be viewed as also appearing near a word associated with keyword A in another document.

"I went on a trip after making a hard decision, but it was July and, thus, the weather was so hot that I suffered."

"I went on a trip after making a hard decision, but it was July and, thus, the weather was so humid that I suffered."

Referring to the above two sentences, the word "hot" is replaced with the word "humid" in the same context. The control unit 320 may infer that "hot" and "humid" are associated words.

"I went on a trip after making a hard decision, but it was July and, thus, the weather was so hot that I suffered."

"I went on vacation after making a hard decision, but it was July and, thus, the weather was so hot that I suffered."

In the same manner, the control unit 320 may infer from the above two sentences that "trip" and "vacation" are associated words.

"I went on a trip after making a hard decision, but it was July and, thus, the weather was so hot that I suffered."

"I went on a trip after making a hard decision, but it was August and, thus, the weather was so hot that I suffered."

In the same manner, the control unit 320 may infer that "July" and "August" are associated words.

The control unit 320 may stores information in which "hot" and "humid" are associated words, "July" and "August" are associated words, and "trip" and "vacation" are associated words via previously collected documents. Thereafter, it is assumed that the following sentences are collected.

"I went on vacation after making a hard decision, but it was July and, thus, the weather was so hot that I suffered."

"I went on a trip after making a hard decision, but it was August and, thus, the weather was so hot that I went through hardship."

When the two sentences do not have the same context but it is known that "hot" and "humid" are associated words, "July" and "August" are associated words, and "trip" and "vacation" are associated words, the control unit 320 may learn that "suffer" and "hardship" are also associated words via the above sentences.

It may be determined that a keyword pair having a high appearing frequency in the same/similar contexts has a high degree of association. Furthermore, it is determined that the higher the similarity between contexts in which two keywords appear is, the higher the degree of association between the two keywords is. The control unit 320 may increase the accuracy of the determination of the degrees of association between keywords in such a manner as to set the degrees of association keywords by performing learning by using collected documents and then setting the degrees of association between keywords appearing in a corresponding sentence by using the set degrees of association between keywords and the context of the sentence.

As similar learning methods, Neural Net Language Model (NNLM), Recurrent Neural Net Language Model (RNNLM), word2vec, skipgram, and Continuous Bag-of-Words (CBOW) methods are known. In particular, when the word2vec method is used, the word2vec method can map individual keywords to vectors by performing learning by using documents, and can determine the similarity between two keywords through the cosine similarity calculation of two vectors.

By means of such a method or a similar method, the control unit 320 may extract a preset number of subordinate keywords having the highest degree of association with each representative attribute keyword by analyzing at least part of the second set documents.

At step 530, the control unit 320 may extract an association weight corresponding to a pair of each representative attribute keyword within the representative attribute keyword candidate set and each subordinate keyword from the second set documents.

Figure 7:
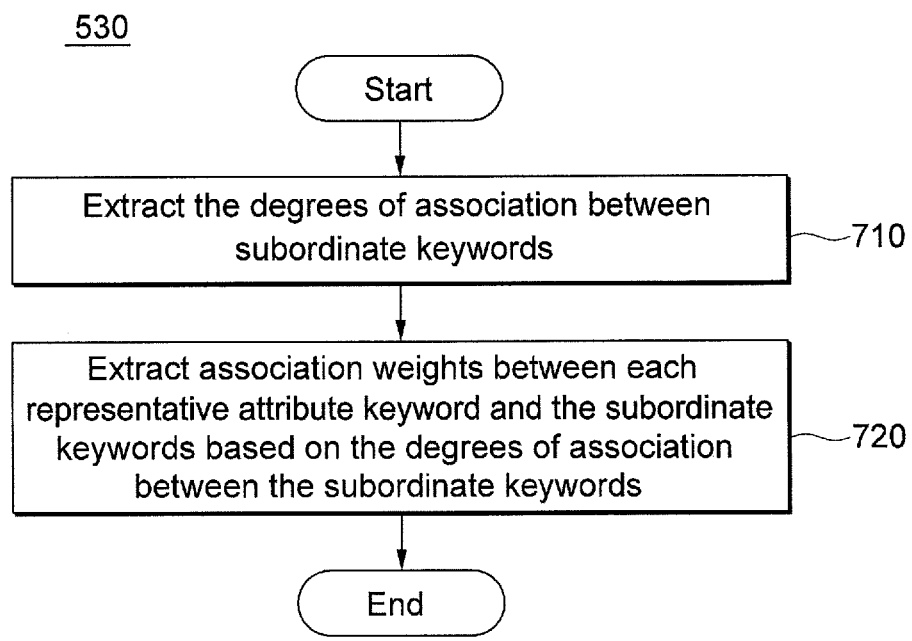
FIG. 7 is a detailed flowchart of step 530 according to an exemplary embodiment of the present disclosure.

FIG. 7 is a detailed flowchart of step 530 according to an exemplary embodiment of the present disclosure.

At step 710, the control unit 320 may extract the degrees of association between the subordinate keywords by analyzing at least part of the second set documents. For example, it is assumed that subordinate keywords collected as subordinate keywords associated with representative attribute keyword A1 are 50 subordinate keywords $B1_1$ to $B1_{50}$. In this case, the control unit 320 may extract the degree of association between two subordinate keywords by using the frequency at which the two subordinate keywords appear in the same document, for these 50 subordinate keywords. The degree of association between $B1_1$ and $B1_2$ is determined based on the frequency at which $B1_1$ and $B1_2$ appear in the same document. According to another exemplary embodiment, the frequency at which $B1_1$ and $B1_2$ appear in the same document influences the degree of association, and, additionally, in the case where $B1_1$ and $B1_2$ appear in the same document, as the distance between the two keywords $B1_1$ and $B1_2$ (or the distance between the sentences in which two keyword appear) is closer, a higher degree of association may be recognized. In a similar method, the degrees of association between subordinate keywords may be extracted. The distance between keywords or the distance between a keyword and a sentence may be determined based on, e.g., any one or more of the number of sentences located between the two keywords or between the keyword and the sentence, the number of words located between the two keywords or between the keyword and the sentence, the number of phases located between the two keywords or between the keyword and the sentence, and the number of letters located between the two keywords or between the keyword and the sentence.

At step 720, the control unit 320 may extract association weights between each representative attribute keyword and the subordinate keywords based on the degrees of association between the subordinate keywords. For example, for a subordinate keyword set corresponding to each representative attribute keyword, the control unit 320 may set a specific subordinate keyword within the subordinate keyword set and the representative attribute keyword so that the degree of association between the specific subordinate keyword within the subordinate keyword set and another subordinate keyword within the subordinate keyword set and an association weight between the specific subordinate keyword and the representative attribute keyword have a positive correlation therebetween.

For example, the higher the degrees of association between the subordinate keyword $B1_1$ of the representative attribute keyword A1 and other subordinate keywords $B1_2$ to $B1_{50}$ of the representative attribute keyword A1 are, the higher value the association weight between A1 and $B1_1$ may be set to. For example, the arithmetic mean (or sum) of the degrees of association between $B1_1$ and the other subordinate keywords $B1_2$ to $B1_{50}$ of A1 may become the association weight between $B1_1$ and A1. A geometric mean/harmonic mean may be used in place of a simple arithmetic mean. There may be used a truncated mean designed to calculate a mean with the two highest ones (examples) of the degrees of association between $B1_1$ and the other subordinate keywords $B1_2$ to $B1_{50}$ of A1 and the two lowest ones (examples) thereof excluded from the calculation. A median may be used in place of the arithmetic mean of the degrees of association.

According to some exemplary embodiments, "the frequency at which $B1_1$ and $B1_2$ appear in the same document" used to calculate the association weight of $B1_1$ for A1 does not vary simply depending on the number of documents in which $B1_1$ and $B1_2$ appear together (in which $B1_1$ and $B1_2$ appear in the same sentence, or in which $B1_1$ and $B1_2$ appear in close proximity to each other), but may be obtained by dividing the number of documents in which $B1_1$ and $B1_2$ appear together (in which $B1_1$ and $B1_2$ appear in the same sentence, or in which $B1_1$ and $B1_2$ appear in close proximity to each other) by the number of documents in which $B1_1$ appears and/or the number of documents in which $B1_2$ appears. In a similar manner, "the frequency at which $B1_1$ and $B1_2$ appear in the same document" may be set such that it has a positive correlation in connection with the number of documents in which $B1_1$ and $B1_2$ appear together (in which $B1_1$ and $B1_2$ appear in the same sentence, or in which $B1_1$ and $B1_2$ appear in close proximity to each other) and has a negative correlation in connection with the number of documents in which $B1_1$ appears and/or the number of documents in which $B1_2$ appears. This is a kind of normalization intended to prevent a frequently used word from simply having a high association weight in connection with the representative attribute keyword A1.

Referring back to FIG. 5, at step 540, the control unit 320 may extract the degrees of subordinate association between an object item and subordinate keywords from the first set documents.

It may be determined that subordinate keywords frequently appearing in the same document, the same sentence or a close sentence as an object keyword (for example "Taylor Swift") representative of an object item in the first set documents are associated with the corresponding object item. The control unit 320 may collect documents in which the object keyword of the corresponding object item appears, and may extract the degree of subordinate association between each subordinate keyword and the object keyword based on the frequency at which they appear together within the documents. In particular, when a subordinate keyword appears in the same sentence as the object keyword, the control unit 320 may set the degree of association between the subordinate keyword and the object item to a higher value than when the subordinate keyword appears in a sentence different from that in which the object keyword appears.

The control unit 320 may set the degree of association between the subordinate keyword and the object item of the corresponding object keyword to a higher value in proportion to the proximity between a sentence in which the subordinate keyword appears and a sentence in which the object keyword appears. The proximity between two sentences may be determined based on, e.g., any one or more of the number of sentences located between the two sentences, the number of words located between the two sentences, the number of phases located between the two sentences, and the number of letters located between the two sentences.

The control unit 320 may set the degree of association between the subordinate keyword and the object item of the corresponding object keyword to a higher value in proportion to the proximity between a location at which the subordinate keyword appears and a location at which the object keyword appears. The proximity between the subordinate keyword and the object keyword may be determined based on, e.g., any one or more of the number of sentences located between the subordinate keyword and the object keyword, the number of words located between the subordinate keyword and the object keyword, the number of phases located between the subordinate keyword and the object keyword, and the number of letters located between the subordinate keyword and the object keyword.

At step 550, the control unit 320 may extract the degree of object-keyword association between the object item and the representative attribute keyword by using the degrees of subordinate association of step 540 and the association weights of step 530.

For example, the degree of object-keyword association between object item C and the representative attribute keyword A1 may be extracted using the degrees of subordinate association between C and the subordinate keywords (e.g., $B1_1$ to $B1_{50}$) of A1 and the association weights of the respectively subordinate keywords. For example, the degree of object-keyword association between the object item C and the representative attribute keyword A1 may be set to a higher value in proportion to the degrees of subordinate association between the object item C and the subordinate keywords $B1_1$ to $B1_{50}$.

When the degree of subordinate association with the object item C is higher for a subordinate keyword having a higher association weight in the relationship with A1, the degree of object-keyword association between the object C and the representative attribute keyword A1 may be set to a higher value for a subordinate keyword having a lower association weight than a case having a higher degree of subordinate association. For example, the degree of subordinate association of a keyword $B1_1$ having a higher association weight is higher in table 1 than in table 2, and thus the degree of object-keyword association between the object C and the representative attribute keyword A1 may be set to a higher value in table 1 than in table 2.

TABLE 1

|  | Association weight in connection with A1 | Degree of subordinate association with C |
| --- | --- | --- |
| $B1_1$ | 0.5 | 0.5 |
| $B1_2$ | 0.2 | 0.2 |

TABLE 2

|  | Association weight in connection with A1 | Degree of subordinate association with C |
| --- | --- | --- |
| $B1_1$ | 0.2 | 0.5 |
| $B1_2$ | 0.5 | 0.2 |

According to an exemplary embodiment, the degree of object-keyword association between the object C and the representative attribute keyword A1 may be obtained based on (or using) the sum of values obtained by multiplying association weights and the degrees of subordinate association corresponding to the individual subordinate keywords. In table 1, 0.5×0.5+0.2×0.2=0.29, and in table 2, 0.2×0.5+ 0.5×0.2=0.20. Accordingly, the degree of object-keyword association between the object C and the representative attribute keyword A1 may be set to a higher value in table 1 than in table 2.

The above-described method of calculating the degree of object-keyword association is merely an example. As long as the degree of subordinate association in connection with C obtained at step 540 and the association weight in connection with A1 obtained at step 530 have a positive correlation with the degree of object-keyword association between C and A1, another method may be used.

Thereafter, when the communication unit 310 receives a request for the provision of information associated with the specific representative attribute keyword, the control unit 320 may provide a result item via the communication unit 310 based on the degree of object-keyword association extracted at step 550. For example, when receiving a request for the provision of information including any one representative attribute keyword, the control unit 320 may provide information about object items in descending order of the degree of object-keyword association in the relationship with the corresponding representative attribute keyword.

In another exemplary embodiment, when receiving a request for the provision of information including two or more representative attribute keywords and corresponding weights, the control unit 320 may provide information about object items in descending order of the sum (or mean) of values obtained by multiplying the degrees of object-keyword association with the representative attribute keywords included in the request for the provision of information by weights (or adding weights to the degrees of object-keyword association) for each object item.

Figure 8:
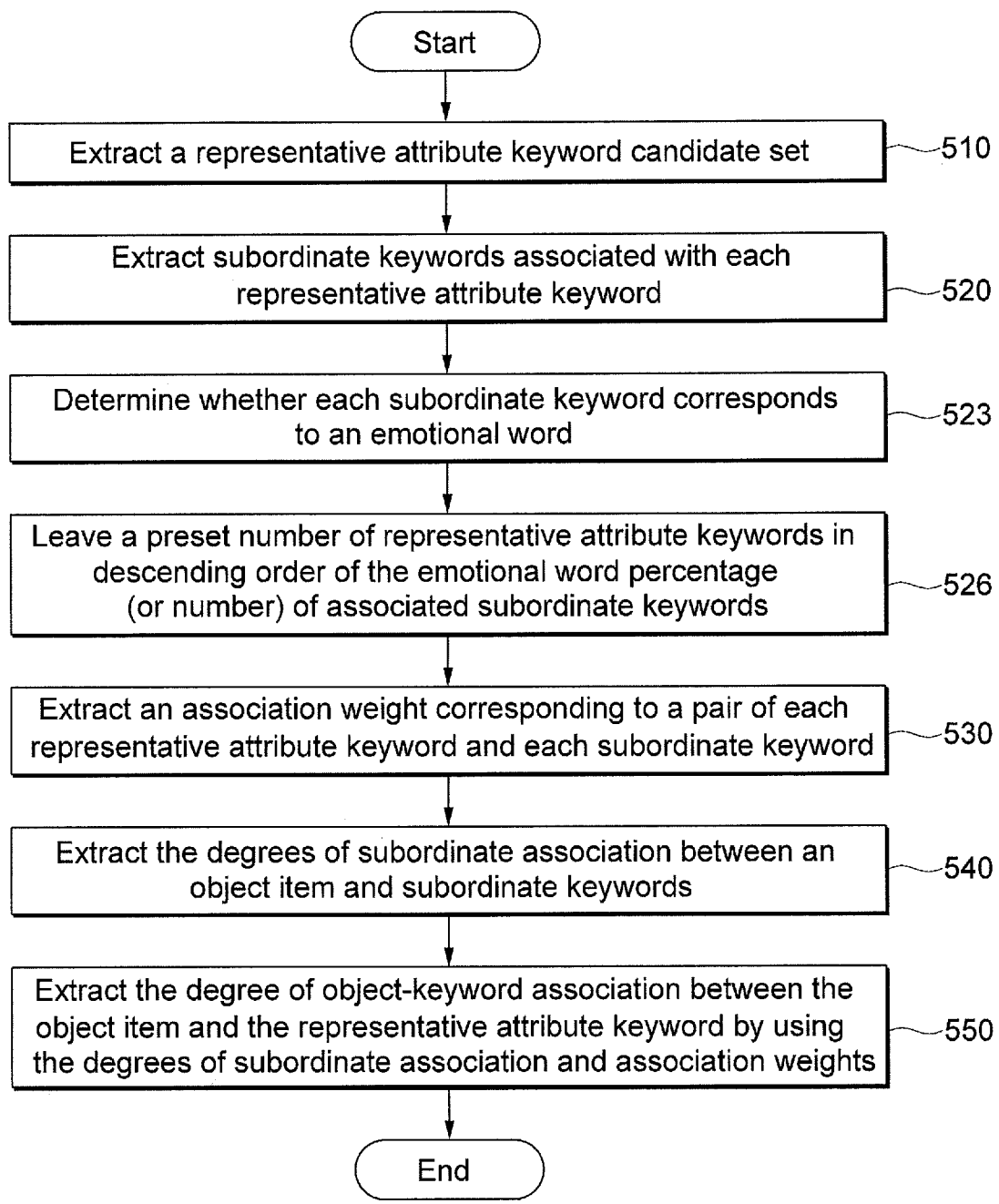
FIG. 8 is a flowchart of a process of providing information according to another exemplary embodiment of the present disclosure.

FIG. 8 is a flowchart of a process of providing information according to another exemplary embodiment of the present disclosure.

The exemplary embodiment of FIG. 8 further includes two steps 523 and 526 between steps 520 and 530 in addition to processes identical to those of the exemplary embodiment of FIG. 5. In this case, redundant descriptions will be omitted, and only steps 523 and 526 will be described.

At step 523, the control unit 320 determines whether each of the subordinate keywords extracted at step 520 corresponds to an emotional word. For this purpose, the storage unit 330 or external server may hold an emotional word dictionary. The emotional word dictionary is a tool for determining whether or not a word (keyword) is an emotional word, and may hold, e.g., an emotional word list. It may be determined that a keyword included in the emotional word list is an emotional word and a keyword not included in the emotional word list is not an emotional word. However, these determinations are based on dictionary meanings, and may not reflect the use of words by the public, which varies over time. Accordingly, the control unit 320 determines whether to use a representative attribute keyword based on whether or not subordinate keywords associated with the representative attribute keyword are emotional words without determining whether or not the representative attribute keyword itself is an emotional word.

In another exemplary embodiment, the control unit 320 may add another word, having a high degree of association (equal to or larger than a preset value) with a preset or larger number of words registered in the emotional word dictionary as emotional words, to the emotional word dictionary.

At step 526, the control unit 320 may leave a preset number of representative attribute keywords in a representative attribute keyword candidate set in descending order of the emotional word percentage (or number) of associated subordinate keywords, and may eliminate the remainder. Through this process, a keyword distant from an emotional word may be prevented from being treated as an emotional word.

Referring back to FIG. 9, at step 920, the control unit 320 stores the degree of basic reserved word-keyword association corresponding to each reserved word-representative attribute keyword pair in the storage unit 330.

Reserved words may include expressions which can be presented by the weights of representative attribute keywords. For example, "boring" may be a reserved word, and "pretty" may be a reserved word.

Representative attribute keywords each having a high degree of basic reserved word-keyword association in connection with the reserved word "boring" may include representative attribute keywords related to the resolution of a boring situation, such as "interesting," "exciting," "time-killing," etc.

Representative attribute keywords having a high degree of basic reserved word-keyword association in connection with the reserved word "pretty" may include representative attribute keywords similar to "pretty" and describing "pretty," such as "beautiful," "cute," "attractive," etc.

For example, the process of step 920 may be performed by input of an administrator, or by receiving the degree of basic reserved word-keyword association, determined by an external system, via a network or storage medium. According to another exemplary embodiment, the process of step 920 may be performed by analyzing collectable documents, such as Internet information, SNS information, news, etc., and using a method similar to the processes of FIGS. 5 to 8. Furthermore, the process of step 920 may include a process of reflecting the feedback of a user, as will be described later.

The process of step 920 may be performed using a method which will be described later with reference to any one of FIGS. 15 to 17.

FIG. 11 shows an example of the degrees of basic reserved word-keyword association according to an exemplary embodiment of the present disclosure.

In the exemplary embodiment of FIG. 11, reserved words are all q ($C_1$ to $C_q$) in number, and representative attribute keywords are all n ($k_1$ to $k_n$) in number.

For example, the degree of basic reserved word-keyword association between the reserved word $C_5$ and the representative attribute keyword $k_3$ is $v_{3,5}$.

At step 930, the communication unit 310 receives and acquires a received reserved word from the terminal 200, and transfers the received reserved word to the control unit 320.

A received reserved word is a reserved word received by the terminal 200 from a search user. The terminal 200 may convert a voice input into an electrical signal (a voice signal), and may transfer the voice signal to the information provision apparatus 300. The control unit 320 of the information provision apparatus 300 may analyze the voice signal, may convert the voice signal into a text, and may match the text to a reserved word. Furthermore, the control unit 320 may analyze the intonation, pitch, tempo, respiration state, etc. of a voice by analyzing the voice signal, and may use analysis results as contextual information.

According to another exemplary embodiment, the terminal 200 may convert the voice input into a text, and may transfer the text to the information provision apparatus 300. The terminal 200 may analyze the intonation, pitch, tempo, respiration state of a voice, etc., and may transfer analysis information to the information provision apparatus 300. The information provision apparatus 300 may use the analysis information as a type of contextual information.

At step 940, the control unit 320 may acquire the degree of reserved word-object association corresponding to a pair of the received reserved word and each object item by using the degree of object-keyword association and the degree of basic reserved word-keyword association.

Figure 12:
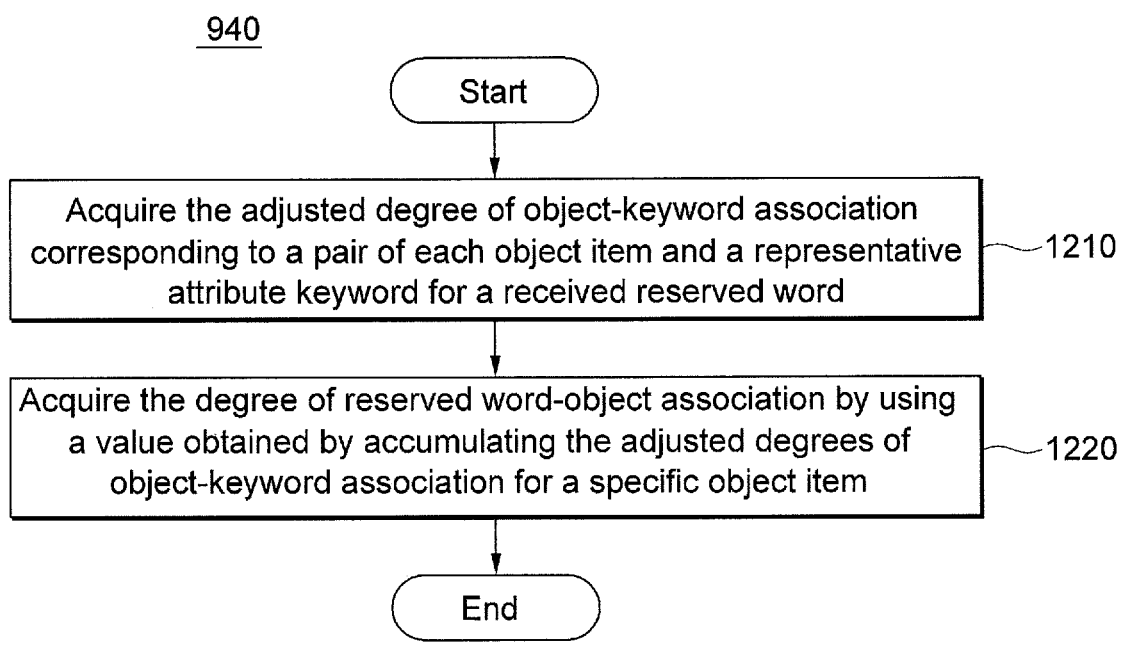
FIG. 12 is a detailed flowchart of step 940 according to an exemplary embodiment of the present disclosure.

FIG. 12 is a detailed flowchart of step 940 according to an exemplary embodiment of the present disclosure.

Referring to FIG. 12, at step 1210, the control unit 320 acquires the adjusted degree of object-keyword association corresponding to a pair of each object item and the representative attribute keyword for the received reserved word.

According to an exemplary embodiment, for a pair of each object item and a representative attribute keyword, the control unit 320 may acquire the adjusted degree of object-keyword association corresponding to a pair of each object item and a representative attribute keyword for the received reserved word by applying the degree of basic reserved word-keyword association corresponding to a pair of the received reserved word and the representative attribute keyword to the degree of object-keyword association corresponding to the pair of the object item and the representative attribute keyword.

In particular, for a pair of each object item and a representative attribute keyword, the control unit 320 may acquire the adjusted degree of object-keyword association corresponding to a pair of each object item and a representative attribute keyword for the received reserved word by using a value obtained by multiplying the degree of object-keyword association corresponding to the pair of the object item and the representative attribute keyword by the degree of basic reserved word-keyword association corresponding to a pair of the received reserved word and the representative attribute keyword.

Furthermore, for a pair of each object item and a representative attribute keyword, the control unit 320 may set the adjusted degree of object-keyword association corresponding to a pair of each object item and a representative attribute keyword for the received reserved word so that the adjusted degree of object-keyword association has a positive correlation with the degree of object-keyword association corresponding to the pair of the object item and the representative attribute keyword and has a positive correlation with the degree of basic reserved word-keyword association corresponding to a pair of the received reserved word and the representative attribute keyword.

In the present disclosure, it is assumed that the degree of object-keyword association, the degree of basic reserved word-keyword association, the adjusted degree of object-keyword association, the degree of basic reserved word-subordinate keyword association, and other values each representative of the degree of association are values which are each representative of a closer correlation in proportion to the size of the value. In another exemplary embodiment, in the case where the value of a type of the degree of association is representative of a closer correlation in inverse proportion to the size of the value and the value of another type of the degree of association value is representative of a closer correlation in proportion to the size of the value, a positive correlation and a negative correlation are appropriately replaced with each other and then used in accordance with the case.

For example, in order to acquire the adjusted degree of object-keyword association corresponding to a pair of object item $i_4$ and representative attribute keyword $k_3$ when the received reserved word is $C_2$, the control unit 320 may acquire the adjusted degree of object-keyword association by applying the degree of basic reserved word-keyword association $v_{3,4}$ corresponding to a pair of the received reserved word $C_2$ and the representative attribute keyword $k_3$ to the degree of object association $w_{4,3}$ corresponding to the pair of the object item $i_4$ and the representative attribute keyword $k_3$.

In particular, a method of applying the degree of association may be a method of multiplying the degree of object association and the degree of basic reserved word-keyword association. For example, in order to acquire the adjusted degree of object-keyword association corresponding to a pair of object item $i_4$ and representative attribute keyword $k_3$ when the received reserved word is $C_2$, the control unit 320 may acquire the adjusted degree of object-keyword association by using the value $(w_{4,3} \times v_{3,2})$ obtained by multiplying the degree of object association $w_{4,3}$ corresponding to the pair of the object item $i_4$ and the representative attribute keyword $k_3$ and the degree of basic reserved word-keyword association $v_{3,2}$ corresponding to a pair of the received reserved word $C_2$ and the representative attribute keyword $k_3$. In another exemplary embodiment, the control unit 320 may acquire the adjusted degree of object-keyword association by using function $f(w_{4,3}, v_{3,2})$ based on another calculation/utilization method adapted to allow the adjusted degree of object-keyword association to have a positive correlation with $w_{4,3}$ and $v_{3,2}$ in place of the multiplication. Furthermore, both a method of using $(w_{4,3} \times v_{3,2})$ as the adjusted degree of object-keyword association and a method of applying another factor-based correction to $(w_{4,3} \times v_{3,2})$ and then using a resulting value as the adjusted degree of object-keyword association may be used.

At step 1220, the control unit 320 may acquire the degree of reserved word-object association by using a value obtained by accumulating the adjusted degrees of object-keyword association for a specific object item. For example, the control unit 320 may set the degree of reserved word-object association corresponding to a pair of the received reserved word and the specific object item so that the degree of reserved word-object association has a positive correlation with the cumulative value of the adjusted degrees of object-keyword association for a specific object item. The degree of reserved word-object association corresponding to a pair of object item $i_4$ and received reserved word $C_2$ may be acquired using, e.g., $\Sigma_{j=1}^{n} f(w_{4,j}, v_{j,2})$. $f(w_{4,j}, v_{j,2})$ is the adjusted degree of object-keyword association corresponding to object item $i_4$, received reserved word $C_2$, and keyword $k_j$.

For example, the degree of reserved word-object association corresponding to a pair of object item $i_4$ and received reserved word $C_2$ may be $\Sigma_{j=1}^{n}(w_{4,j} \times v_{j,2}) = (w_{4,1} \times v_{1,2}) + (w_{4,2} \times v_{2,2}) + \ldots + (w_{4,n} \times v_{n,2})$. In another example, the degree of reserved word-object association corresponding to a pair of object item $i_4$ and received reserved word $C_2$ may be a value obtained by applying another factor-based correction to $\Sigma_{j=1}^{n}(w_{4,j}, v_{1,2})$.

Referring back to FIG. 9, at step 950, the control unit 320 may provide an object item according to the degree of reserved word-object association corresponding to the received reserved word. For example, when the degrees of reserved word-object association corresponding to received reserved word $C_2$ are as shown in table 3, the control unit 320 may provide object items in the order shown in table 4.

TABLE 3

| Object item | Degree of reserved word-object association with received reserved word |
|---|---|
| $i_1$ | 0.23 |
| $i_2$ | 0.33 |
| $i_3$ | 0.99 |
| $i_4$ | 0.84 |

TABLE 4

| Order | Object item | Degree of reserved word-object association with received reserved word |
|---|---|---|
| 1 | i3 | 0.99 |
| 2 | i4 | 0.84 |
| 3 | i2 | 0.33 |
| 4 | i1 | 0.23 |

In other words, the control unit 320 may provide object items in descending order of the degree of reserved word-object association corresponding to the received reserved word. The terminal 200 having received the object items may provide information about object item $i_3$ to a user via the display unit 220. The terminal 200 may provide information about another object item at a lower order position when necessary. The terminal 200 may provide information about object item i3 to a user by voice through a speaker in place of the display unit 220.

Figure 13:
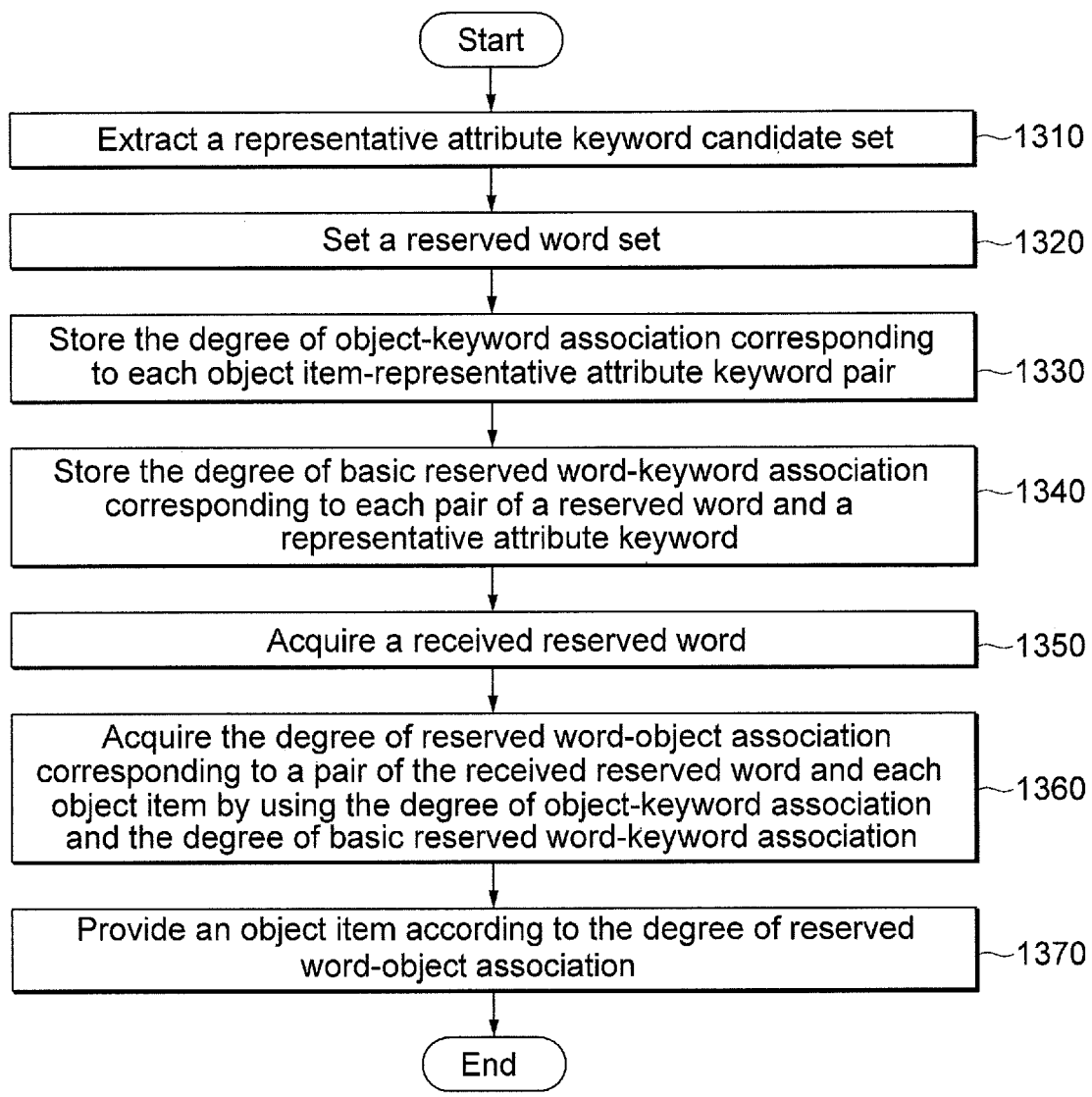
FIG. 13 is a flowchart of a process of providing information according another exemplary embodiment of the present disclosure.

FIG. 13 is a flowchart of a process of providing information according another exemplary embodiment of the present disclosure.

The processes of FIGS. 13 to 17 may be performed by using some of the processes of FIGS. 5 to 12 or modifying some of the processes of FIGS. 5 to 12. When the processes of FIGS. 13 to 17 are described, descriptions of FIGS. 5 to 12 may be quoted when necessary.

Referring to FIG. 13, at step 1310, the control unit 320 extracts a representative attribute keyword candidate set from first set documents. For example, the control unit 320 may collect keywords, frequently appearing in the documents of the first set documents corresponding to a field of interest, as a representative attribute keyword candidate set. The process of step 1310 may be performed in a manner identical or similar to, e.g., that of the process of step 510 of FIG. 5. The process of step 1310 may be performed in a manner identical and similar to that of the process of FIG. 6. The description of the process of FIG. 6 is not repeated.

At step 1320, the control unit 320 sets a reserved word set. For example, an administrator may set a reserved word set through manual input. According to a modified exemplary embodiment, the control unit 320 may set word phrases/passages, etc. suitable for reserved words as reserved word candidates, and may provide an interface configured to allow one or more of the reserved word candidates as reserved words.

Figure 18:
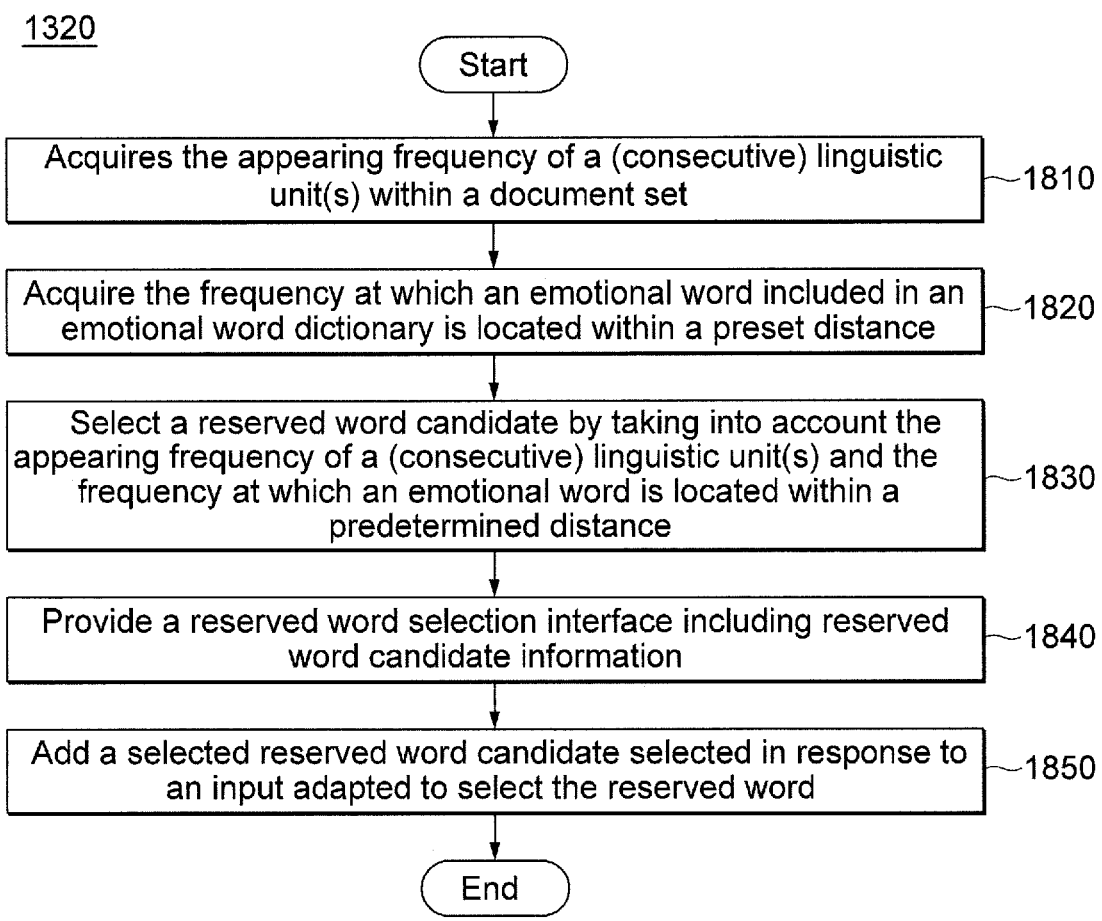
FIG. 18 is a detailed flowchart of step 1320 according to a modified exemplary embodiment of the present disclosure.

FIG. 18 is a detailed flowchart of step 1320 according to a modified exemplary embodiment of the present disclosure.

At step 1810, the control unit 320 acquires the appearing frequency of one linguistic unit or two or more consecutive linguistic units within the document set. In this case, the document set may be the same as or different from the document set used in the process of step 510 of FIG. 5.

The linguistic unit may be, e.g., any one of a word phrase, a word, a morpheme, a syllable, and a letter. Other units defined to segment a sentence based on various criteria may be used as the linguistic unit in the present exemplary embodiment.

Before step 1810, the control unit 320 may segment documents, included in the individual documents of the document set, into word phrase units and store the word phrase units in the form of an array or list. In an exemplary embodiment, the control unit 320 may delete insignificant words, e.g., some postpositional particles and demonstrative adjective, such as "이," "저," etc., in Korean, and other words not requiring analysis from each word phrase, or may remove from the array or list. Furthermore, in an exemplary embodiment, when a word phrase is composed of one word, the control unit 320 may convert the corresponding word into a basic or preset form.

According to a modified exemplary embodiment, before step 1810, the control unit 320 may segment documents, included in the individual documents of the document set, into word units and store the word units in the form of an array or list. In an exemplary embodiment, the control unit 320 may convert each word into a basic (or preset) form. In an exemplary embodiment, the control unit 320 may remove insignificant words, e.g., some postpositional particles and demonstrative adjective, such as "이," "저," etc., in Korean, and other words not requiring analysis from the array or list.

There may be possible a modified exemplary embodiment in which the control unit 320 segments documents into morpheme units, syllable units, or letter units.

In the following exemplary embodiment, for the sake of convenience, it is assumed that the control unit 320 segments the documents into word phrase units and the word phrases become linguistic units.

A single linguistic unit may become a reserved word. According to a modified exemplary embodiment, two or more consecutive linguistic units also become a reserved word. For example, "neat" (a single linguistic unit) may become a reserved word, "nicely atmospheric" (two consecutive linguistic units) may become a reserved word. However, two or more consecutive linguistic units appear less frequently than a single linguistic unit. Accordingly, in an exemplary embodiment, a weight or an additional score may be given to two or more consecutive linguistic units upon the selection of reserved words so that the two or more consecutive linguistic units can be selected as a reserved word. According to a modified exemplary embodiment, upon the selection of reserved words, a reference value for the selection of a reserved word may be set to a lenient value for two or more consecutive linguistic unit. For example, in the case where a single linguistic unit may be recommended as a reserved word candidate only when it appears at least "a" times, settings may be made such that two consecutive linguistic units may be recommended as a reserved word candidate even when they appear "b" times considerably less than "a" times and such that three consecutive linguistic units may be recommended as a reserved word candidate even when they appear "c" times less than "b" times. In the following, two or more consecutive linguistic units are called consecutive linguistic units.

Furthermore, in the case where consecutive linguistic units are recommended/selected as a reserved word, it is included in a linguistic unit included in the reserved word candidate or in the reserved word candidate itself, and consecutive linguistic units shorter than the reserved word candidate may be prevented from being recommended as reserved words, or a deduction in a score may be made during the calculation of a score used to recommend the units as a reserved word. The reason for this is to prevent a plurality of similar reserved words from being selected or recommended. In the following, for the sake of simplicity of description, although descriptions of consecutive linguistic units will be omitted, descriptions of a single linguistic unit may be applied to consecutive linguistic units in an identical or similar manner.

At step 1810, the appearing frequency of a linguistic unit may be, e.g., the number of documents in which the corresponding linguistic unit appears. Even when a corresponding linguistic unit appears in a single document a plurality of times, only an appearing frequency of 1 is recognized. In contrast, according to another exemplary embodiment, in the case where a corresponding linguistic unit appears in a single document a plurality of times, the number of times may be all recognized as an appearing frequency, and the appearing frequency may become the appearing frequency of the linguistic unit.

According to still another exemplary embodiment, in the case where a corresponding linguistic unit appears in a single document two or more times, second and later appearances may be evaluated as being lower than a first appearance. Furthermore, in the case where the appearance of a corresponding linguistic unit is repeated in a single document, later appearances may be evaluated as being lower. Although a score increases as the number of appearances increases, the gradient of scores gradually becomes gentle. For example, an appearance frequency to the power of 1/r (where r is a real number larger than 1) may be used as the appearance score of a corresponding linguistic unit in a corresponding document. For example, (the log value of an appearing frequency)+1 (where when the appearing frequency is 0, a corresponding appearance score is 0) or the like may be used. Furthermore, the appearance score of a linguistic unit in a single document may be limited to a value equal to or smaller than a preset upper limit value. A value obtained by accumulating the appearance scores of a corresponding linguistic unit for all documents may become an appearance score based on the appearing frequencies of the corresponding linguistic unit. Furthermore, this appearance score may be used at step 1830.

In the following, for the sake of convenience, the following description will be given on the assumption that the appearing frequency of a linguistic unit is the number of documents in which the corresponding linguistic unit appears.

At step 1820, the control unit 320 acquires the frequency at which an emotional word is located within a preset distance from a linguistic unit. The distance between the linguistic unit and the emotional word may be determined based on, e.g., any one or more of the number of words located between the linguistic unit and the emotional word, the number of word phrases located between the linguistic unit and the emotional word, and the number of letters located between the linguistic unit and the emotional word.

Furthermore, when a linguistic unit and an emotional word belong to different sentences, the control unit 320 may determine that the emotional word is not located within the preset distance from the linguistic unit regardless of the number of words, word phrases and/or letters located between the linguistic unit and the emotional word. According to another modified exemplary embodiment, when a linguistic unit and an emotional word belong to different sentences, the control unit 320 may calculate the distance therebetween by adding a predetermined numerical value to a calculated distance without taking into account the sentences. The reason for this is that when a linguistic unit and an emotional word belong to different sentences, probability that they have no correlation is stronger, and thus it is preferable that the distance therebetween is evaluated as being longer than the number of words, word phrases and/or letters located between the linguistic unit and the emotional word.

Whether a specific word (a word phrase) is an emotional word may be determined by referring to the previously registered emotional word dictionary.

The frequency at which an emotional word is located within a predetermined distance from a linguistic unit may be, e.g., the number of documents in which the corresponding linguistic unit and the corresponding emotional word are located together within a predetermined distance. Even when a corresponding linguistic unit and a corresponding emotional word appear within the predetermined distance a plurality of times in a single document, only an appearing frequency of 1 is recognized. According to another exemplary embodiment, when an emotional word is located within a predetermined distance from a plurality of linguistic units, all cases where the emotional word is located within the predetermined distance from the individual linguistic units may be recognized as a frequency. In the following, a linguistic unit located within the predetermined distance from an emotional word is called an emotional word location linguistic unit.

According to still another exemplary embodiment, in the case where an emotional word location linguistic unit appears in a single document two or more times, second and later appearances may be evaluated as being lower than a first appearance. Furthermore, in the case where the appearance of a corresponding emotional word location linguistic unit is repeated in a single document, later appearances may be evaluated as being lower. Although a score increases as the number of appearances increases, the gradient of scores gradually becomes gentle. For example, an appearance frequency to the power of $1/r$ (where r is a real number larger than 1) may be used as the appearance score of a corresponding emotional word location linguistic unit in a corresponding document. For example, (the log value of an appearing frequency)+1 (where when the appearing frequency is 0, a corresponding appearance score is 0) or the like may be used. Furthermore, the appearance score of an emotional word location linguistic unit in a single document may be limited to a value equal to or smaller than a preset upper limit value. A value obtained by accumulating the appearance scores of a corresponding emotional word location linguistic unit for all documents may become an appearance score based on the appearing frequencies of the corresponding emotional word location linguistic unit. Furthermore, this appearance score may be used at step 1830.

Furthermore, according to another exemplary embodiment, a higher appearance score may be recognized in proportion to the number of emotional words located within a predetermined distance from one linguistic unit. Furthermore, when an emotional word is located within a shorter distance from one linguistic unit, a higher appearance score may be recognized. Furthermore, only when preset two or more emotional words are located within a predetermined distance from one linguistic unit may an appearance score (an appearing frequency) be recognized.

For the sake of convenience, the following description will be given on the assumption that the appearing frequency of an emotional word location linguistic unit is the number of documents in which an emotional word appears within a preset distance from a corresponding linguistic unit.

At step 1830, the control unit 320 selects a reserved word candidate by taking into account the appearing frequency of a corresponding linguistic unit and the frequency at which an emotional word is located within a predetermined distance from the linguistic unit.

For example, the control unit 320 obtains an emotional word score by multiplying the appearing frequency of a corresponding linguistic unit and the frequency at which an emotional word is located within a predetermined distance from the linguistic unit (or by using a calculation method which has a positive correlation for the two variables). Furthermore, a preset number of reserved word candidates may be set in descending order of the score. Alternatively, linguistic units corresponding to a preset score or more may be set as reserved word candidates.

TABLE 5

| Linguistic unit | Appearing frequency | Emotional word location frequency | Score |
|---|---|---|---|
| First linguistic unit | 3003 | 1122 | 3369366 |
| Second linguistic unit | 2001 | 1820 | 3641820 |
| Third linguistic unit | 3121 | 1300 | 4057300 |
| Fourth linguistic unit | 200 | 110 | 22000 |

In the example of table 5, the linguistic units may become reserved word candidates in order of the third linguistic unit→the second linguistic unit→the first linguistic unit→the fourth linguistic unit. When the control unit 320 recommends two reserved word candidates, the third linguistic unit and the second linguistic unit will be recommended. When the control unit 320 recommends linguistic units equal to or larger than a perfect score of 300 as reserved word candidates, the third linguistic unit, the second linguistic unit, and the first linguistic unit will be recommended as reserved word candidates in order thereof.

According to another exemplary embodiment, the control unit 320 may extract a first number of linguistic units in order of the appearing frequencies of the linguistic units, and may then extract a predetermined number of reserved word candidates in descending order based on the frequency at which an emotional word appears within a predetermined distance from the extracted linguistic units (or an emotional word score). In the example of table 5, when three linguistic units are extracted in descending order of their appearing frequency, the first to third linguistic units may be extracted. Based on the appearing frequencies of emotional words, reserved word candidates may be recommended in order of the second linguistic unit, the third linguistic unit, and the first linguistic unit.

Furthermore, according to another exemplary embodiment, the control unit 320 may extract a first number of linguistic units in descending order of the appearing frequencies of the linguistic units, and may then extract a first number of reserved word candidate (where the second number is less than the first number) in descending order based on the frequency at which an emotional word appears within a predetermined distance from the extracted linguistic units (or an emotional word score). In the example of table 5, when three linguistic units are extracted in descending order of their appearing frequency, the first to third linguistic units may be extracted. When two linguistic units are extracted based on an emotional word appearing frequency, reserved word candidates may be recommended in order of the second linguistic unit and the third linguistic unit.

Using another method similar or slightly different from the above-described method, the control unit 320 may set a score for the selection of reserved word candidates so that the score for the selection of reserved word candidates has a positive correlation with the appearing frequencies of linguistic units at step 1810 and also has a positive correlation with the appearing frequencies of linguistic units from which an emotional word is located within the preset distance at step 1820, and may recommend reserved word candidates by using the score.

Furthermore, the control unit 320 may perform processing such that a linguistic unit already included in a reserved word set can be prevented from being recommended as a reserved word candidate. Furthermore, the control unit 320 may perform processing such that a linguistic unit substantially identical to a reserved word included in the reserved word set can be prevented from being added to reserved word candidates.

At step 1840, the information provision apparatus 300 provides the terminal 200 with interface information adapted to generate a reserved word selection interface including reserved word candidate information. The interface information may be, e.g., a document in an html form. According to another exemplary embodiment, the interface information may include only dynamic information (recommended reserved word candidates, etc.) required to generate the interface, and the terminal 200 may provide a page including the interface to a user in such a manner as to incorporate the dynamic information into a page form stored in the terminal 200 in advance.

The control unit 320 may generate page information adapted to generate the page including the reserved word selection interface inclusive of the reserved word candidate information, and the communication unit 310 may provide the page information to the terminal 200. The terminal 200 may display the page including the corresponding interface to a user through rendering. According to a modified exemplary embodiment, an interface based on sound or an interface based on technology known currently or to be known in the future may be provided in place of the interface included in the visual page. For the sake of convenience, the following description will be given on the assumption that the interface included in the visual page is provided.

Figure 19:
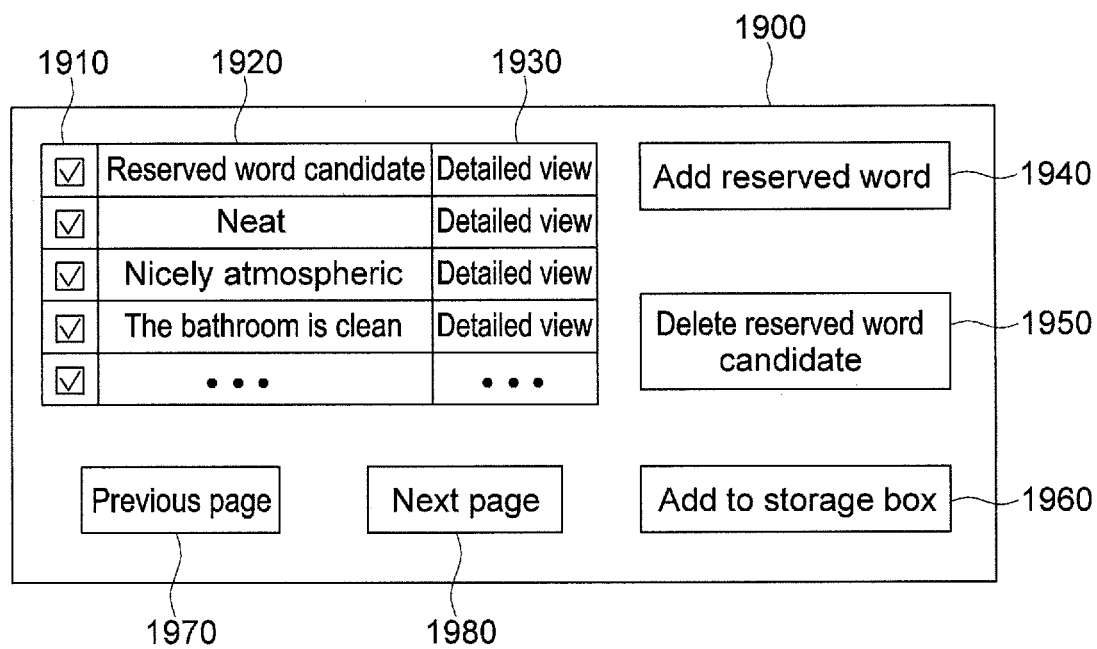
FIG. 19 is an example of an interface generated based on the interface information provided at step 1840.

FIG. 19 is an example of an interface 1900 generated based on the interface information provided at step 1840.

Referring to FIG. 19, the interface 1900 includes a table, including a check box column 1910, a reserved word candidate column 1920, and a detailed view column 1930. Furthermore, the interface 1900 may include a reserved word addition button 1940, a candidate deletion button 1950, and an add-to-storage box button 1960. A user may select at least one desired reserved word candidate on the check box column 1910, and may process the reserved word candidate by selecting any one of the reserved word addition button 1940, the candidate deletion button 1950, and the add-to-storage box button 1960. Once the any one of the buttons has been selected, the terminal 200 may transfer input information, obtained by converting the input of the user, to the information provision apparatus 300.

The information provision apparatus 300 may process the reserved word candidate according to the input information received from the terminal 200. For example, when a user selects the check boxes 1910 of some reserved word candidates (hereinafter referred to as the "selected candidates") and also selects the reserved word addition button 1940, the control unit 320 of the information provision apparatus 300 having related input information may add the selected candidates to a reserved word set and also delete the selected candidates from a reserved word candidate set. The control unit 320 performs control such that the language units included in the reserved word set and linguistic units substantially identical to the language units included in the reserved word set can be prevented from being recommended as reserved word candidates upon the future recommendation of reserved word candidates.

According to another example, when a user selects the check boxes 1910 of some reserved word candidates and also selects the reserved word candidate deletion button 1950, the control unit 320 of the information provision apparatus 300 having received related input information may add the selected candidates to a reserved word exclusion set and delete the selected candidates from the reserved word candidate set. The control unit 320 performs control such that the language units included in the reserved word exclusion set and linguistic units substantially identical to the language units included in the reserved word exclusion set can be prevented from being recommended as reserved word candidates upon the future recommendation of reserved word candidates.

Furthermore, according to another example, when a user selects the check boxes 1910 of some reserved word candidates and also selects the add-to-storage box button 1960, the control unit 320 of the information provision apparatus 300 having received related input information may add the selected candidates to a reserved word candidate storage set and delete the selected candidates from the reserved word candidate set. The control unit 320 performs control such that the language units included in the reserved word candidate storage set and linguistic units substantially identical to the language units included in the reserved word candidate storage set can be prevented from being recommended as reserved word candidates upon the future recommendation of reserved word candidates.

Another interface similar to the buttons or another interface capable of replacing the functions of the buttons may be used in place of the buttons 1940, 1950 and 1960.

Furthermore, the control unit 320 may provide an interface adapted to delete part of reserved words from the reserved word set. The control unit 320 may provide an interface adapted to delete a linguistic unit from the reserved word exclusion set such that part of the linguistic units in the reserved word exclusion set are prevented from being excluded from recommendation. The control unit 320 may provide the linguistic unit of the reserved word candidate storage set in the form of a list interface similar to that of FIG. 19, and may enable a user to add part of the linguistic units of the reserved word candidate storage set as a reserved word via the list interface. Furthermore, a user may include part of the linguistic units of the reserved word candidate storage set in the reserved word exclusion set and delete the part of the linguistic units from the reserved word candidate storage set via the list interface. In this case, the corresponding linguistic unit is not provided via the list interface of the reserved word candidate storage set any longer, and is not recommended as a reserved word candidate via the interface 1900 of FIG. 19 any longer. Furthermore, a user may simply delete part of the linguistic units of the reserved word candidate storage set from the reserved word candidate storage set via the list interface. In this case, the corresponding linguistic unit is not provided via the list interface of the reserved word candidate storage set any longer, but may be recommended as a reserved word candidate via the interface 1900 of FIG. 19.

Furthermore, the interface 1900 may include a previous page button 1970 and/or a subsequent page button 1980 for switching between pages in preparation for a case where reserved word candidates cannot be all displayed within a single page. The previous page button 1970 and/or the subsequent page button 1980 may be selectively provided depending on the number of actual candidates and a current page location. Furthermore, there may be provided an interface adapted to be extendable through scrolling in place of the previous page button 1970 and/or the subsequent page button 1980. In some interfaces, only a table including the items 1910, 1920 and 1930 may be scrolled, and the buttons 1940, 1950, 1960, 1970 and 1980 may be excluded from scrolling.

A user may refer to a background for the recommendation of a reserved word candidate or related information in detail by selecting the detailed view 1930. An interface which is provided by the control unit 320 when the detailed view 1930 is selected may include an interface adapted to add information about a corresponding reserved word candidate and the corresponding reserved word candidate as a reserved word, to the reserved word candidate storage set, or to the reserved word exclusion set.

The control unit 320 may provide an interface configured to manage reserved word candidates to a user via the terminal 200.

Referring back to FIG. 18, at step 1850, the control unit 320 may add a selected reserved word candidate to the reserved word set in response to an input adapted to select the reserved word.

Referring back to FIG. 13, at step 1330, the control unit 320 stores the degree of object-keyword association corresponding to each object item-representative attribute keyword pair.

FIG. 10 shows an example of the stored degrees of object-keyword association according to an exemplary embodiment of the present disclosure.

In the exemplary embodiment of FIG. 10, object items are all in m ($i_1$ to $i_m$) in number, and representative attribute keywords are all n ($k_1$ to $k_n$) in number.

For example, the degree of object-keyword association between the object item $i_5$ and the representative attribute keyword $k_3$ is $w_{5,3}$.

The process of step 1330 may be performed according to, e.g., part of the exemplary embodiments of FIGS. 5 to 8, or a process similar or corresponding to the part. According to another exemplary embodiment, the process of step 1330 may be performed by the input of an administrator or by receiving the degree of object-keyword association, determined by an external system, via a network or storage medium.

Since the exemplary embodiments of FIGS. 5 to 8 have been described above, redundant descriptions will be omitted. However, the process of step 510 of FIGS. 5 and 8 is substantially the same as the process of step 1310 of FIG. 13. Accordingly, when the process of step 1330 is performed, the process of step 510 may not be performed again and the result of step 1310 may be reused even when the exemplary embodiments of FIGS. 5 to 8 are used.

At step 1340, the control unit 320 stores the degree of basic reserved word-keyword association corresponding to each pair of a reserved word and a representative attribute keyword in the storage unit 330 by using an association weight corresponding to a pair of the representative attribute keyword and a subordinate keyword and the degree of basic reserved word-subordinate keyword association corresponding to a pair of the reserved word and the subordinate keyword. The process of step 1340 may be performed according to, e.g., the input of an administrator or the exemplary embodiments of any one or more of FIGS. 15 to 17.

Before or during the process of step 1340, the subordinate keyword needs to be determined, the association weight corresponding to the pair of the representative attribute keyword and the subordinate keyword needs to be determined, and the degree of basic reserved word-subordinate keyword association corresponding to the pair of the reserved word and the subordinate keyword needs to be determined.

The subordinate keyword used in the process of step 1340 may be determined through the performance of step 520 during the process of step 1330. In this case, the subordinate keyword of step 520 may be used at step 1340. Unless the subordinate keyword is determined at step 1330, the subordinate keyword may be determined through step 520 of FIG. 5 and a process identical or similar to its previous process.

The association weight used in the process of step 1340 may be determined through the performance of step 530 during the process of step 1330. In this case, the association weight of step 530 may be used at step 1340. Unless the association weight is determined at step 1330, the association weight may be determined step 530 of FIG. 5 and a process identical or similar to its previous process.

The degree of basic reserved word-subordinate keyword association may be calculated by, e.g., taking into account the frequency at which the reserved word and the subordinate keyword appear in the same context or similar contexts.

In the following, in the descriptions of FIGS. 15 to 17, an example of obtaining the degree of basic reserved word-keyword association $v_{3,2}$ between reserved word $C_2$ and representative attribute keyword $k_3$ is described. For example, it is assumed that the subordinate keywords of the representative attribute keyword $k_3$ are $B3_1$ to $B3_{50}$. For the reserved word, the representative attribute keyword, and the degree of basic reserved word-keyword association, reference is made to the example described above with reference to FIG. 11. The degree of basic reserved word-subordinate keyword association corresponding to a pair of reserved word $C_j$ and subordinate keyword $B_{gh}$ is represented by $x_{j,h}$. An association weight corresponding to a pair of the subordinate keyword $B_{gh}$ and representative attribute keyword $k_g$ is represented by $y_{g,h}$. The adjusted degree of reserved word-subordinate keyword association corresponding to the combination of reserved word $C_j$, representative attribute keyword $k_g$, and subordinate keyword $B_{gh}$ is represented by $x_{j,g,h}$.

Figure 15:
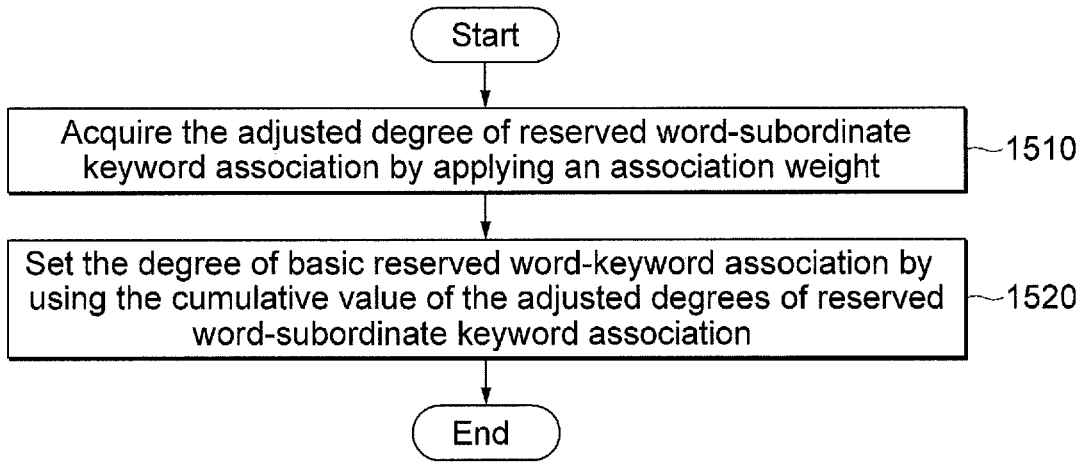
FIG. 15 is a detailed flowchart of step 1340 according to a first exemplary embodiment of the present disclosure.

FIG. 15 is a detailed flowchart of step 1340 according to a first exemplary embodiment of the present disclosure.

Referring to FIG. 15, at step 1510, the control unit 320 acquires the adjusted degree of reserved word-subordinate keyword association by applying the association weight to the degree of basic reserved word-subordinate keyword association.

At step 1510, for each reserved word-subordinate keyword pair, the control unit 320 may obtain the adjusted degree of reserved word-subordinate keyword association corresponding to the reserved word-subordinate keyword pair for the representative attribute keyword by applying an association weight corresponding to a subordinate keyword-representative attribute keyword pair to the degree of basic reserved word-subordinate keyword association corresponding to the reserved word-subordinate keyword pair.

For example, in order to acquire the adjusted degree of reserved word-subordinate keyword association between $C_2$ and $B3_4$ corresponding to a pair of subordinate keyword $B3_4$ and representative attribute keyword $k_3$ when a reserved word is $C_2$, the control unit 320 may obtain the adjusted degree of reserved word-subordinate keyword association $x_{2,3,4}$ by applying association weight $y_{3,4}$ corresponding to the pair of the subordinate keyword $B3_4$ and the representative attribute keyword $k_3$ to the degree of basic reserved word-subordinate keyword association $x_{2,4}$ corresponding to a pair of the reserved word $C_2$ and the subordinate keyword $B3_4$.

In particular, a method of applying an association weight may be a method of multiplying the degree of basic reserved word-subordinate keyword association $x_{2,4}$ by the association weight $y_{3,4}$ corresponding to the pair of the subordinate keyword $B3_4$ and the representative attribute keyword $k_3$. For example, in order to acquire the adjusted degree of reserved word-subordinate keyword association $x_{2,3,4}$ between $C_2$ and $B3_4$ corresponding to a pair of the subordinate keyword $B3_4$ and the representative attribute keyword $k_3$ when the reserved word is $C_2$, the control unit 320 may acquire the adjusted degree of reserved word-subordinate keyword association $x_{2,3,4}$ by using value $x_{2,4} \times y_{3,4}$ obtained by multiplying the pair of the reserved word $C_2$ and the subordinate keyword $B3_4$ corresponding to the degree of basic reserved word-subordinate keyword association $x_{2,4}$ by association weight $y_{3,4}$ corresponding to the pair of the subordinate keyword $B3_4$ and the representative attribute keyword $k_3$. In another exemplary embodiment, the control unit 320 may acquire the adjusted degree of reserved word-subordinate keyword association $x_{2,3,4}$ by using function $f(x_{2,4}, y_{3,4})$ based on another calculation/utilization method adapted to allow the adjusted degree of reserved word-subordinate keyword association $x_{2,3,4}$ to have a positive correlation with $x_{2,4}$ and $y_{3,4}$ in place of the multiplication. Furthermore, both a method of using $(x_{2,4} \times v_{3,4})$ as the adjusted degree of reserved word-subordinate keyword association $x_{2,3,4}$ and a method of applying another factor-based correction to $(x_{2,4} \times v_{3,4})$ and then using a resulting value as the adjusted degree of reserved word-subordinate keyword association $x_{2,3,4}$ may be used.

At step 1520, the control unit 320 may set the degree of basic reserved word-keyword association by using the cumulative value of the adjusted degrees of reserved word-subordinate keyword association $x_{2,3,f}$ between the reserved word $C_2$ and the representative attribute keyword $k_3$. In other words, the degree of basic reserved word-keyword association between the reserved word $C_2$ and the representative attribute keyword $k_3$ may be $\Sigma_{f=1}^{50} x_{2,3,f}$. In other words, the degree of basic reserved word-keyword association between the reserved word $C_2$ and the representative attribute keyword $k_3$ may be obtained by obtaining the degrees of basic reserved word-subordinate keyword association $x_{2,f}$ with reserved word $C_2$ for subordinate keywords $B3_1$ to $B3_{50}$, obtaining $x_{2,3,f}$ by incorporating an association weight $y_{3,f}$ for the corresponding subordinate keyword to each of the degrees of basic reserved word-subordinate keyword association $x_{2,f}$, and then accumulating $x_{2,3,f}$. According to another exemplary embodiment, the degree of basic reserved word-keyword association between the reserved word $C_2$ and the representative attribute keyword $k_3$ may be a value obtained by applying another factor-based correction to $\Sigma_{f=1}^{50} x_{2,3,f}$. According to another exemplary embodiment, the degree of basic reserved word-keyword association between the reserved word $C_2$ and the representative attribute keyword $k_3$ may be a value having a positive correlation with $\Sigma_{f=1}^{50} x_{2,3,f}$. In this case, it is assumed that subordinate keywords connected to one representative attribute keyword are 50 in number. However, when the number of subordinate keywords connected to a representative attribute keyword varies, the cumulative range of f may become a different value, other than 50, in the formula.

Figure 16:
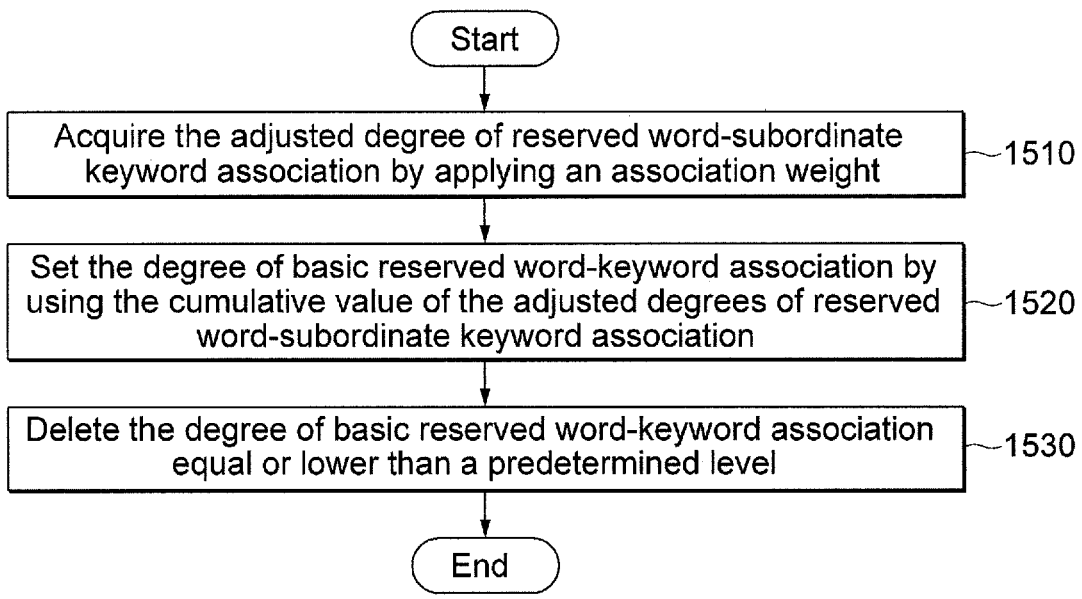
FIG. 16 is a detailed flowchart of step 1340 according to another exemplary embodiment of the present disclosure.

FIG. 16 is a detailed flowchart of step 1340 according to another exemplary embodiment of the present disclosure. Since the processes of steps 1510 and 1520 of FIG. 16 are the same as the processes described with reference to FIG. 15, redundant descriptions will be omitted.

Referring to FIG. 16, at step 1530, the control unit 320 may delete the degree of basic reserved word-keyword association for at least one representative keyword, for which the degree of basic reserved word-keyword association for a pair of the reserved word and the corresponding representative keyword is equal or lower than the reference degree of basic reserved word-keyword association, among representative keywords corresponding to a specific reserved word. Representative keywords corresponding to a specific reserved word refer to keywords for which the degrees of basic reserved word-keyword association have been set in the relationship with the specific reserved word. The reference degree of basic reserved word-keyword association may be set in advance. According to another exemplary embodiment, the reference degree of basic reserved word-keyword association may be set using the average value of the degrees of basic reserved word-keyword association corresponding to the specific reserved word, or may be set using the degree of basic reserved word-keyword association at a specific order position when the degrees of basic reserved word-keyword association corresponding to the specific reserved word are arranged in the order of their size. Another specific value having a positive correlation with the degrees of basic reserved word-keyword association corresponding to the specific reserved word may become the reference degree of basic reserved word-keyword association. The reference degree of basic reserved word-keyword association may vary depending on a reserved word, and may be the same for all reserved words. The deletion of the degree of basic reserved word-keyword association means that there is no degree of association between a reserved word and a representative keyword. The control unit 320 may set the degree of association to 0. Alternatively, the control unit 320 may delete the degree of basic reserved word-keyword association in such a manner as to delete information about the degree of basic reserved word-keyword association of a pair of the reserved word and the corresponding representative keyword in a list (which may be replaced with an array, or another data structure) showing the degrees of basic reserved word-keyword association. There may be used another method of adding information indicating that the degree of basic reserved word-keyword association has been deleted (or an associative relationship has been deleted).

Through the process of step 1530, the degree of basic reserved word-keyword association having a relatively slight degree of association is deleted (i.e., a setting is made such that there is no degree of association), and thus excessively complicated calculation may be prevented from being performed or an associative relationship substantially meaningless to a user/administrator may be prevented from being displayed.

Figure 17:
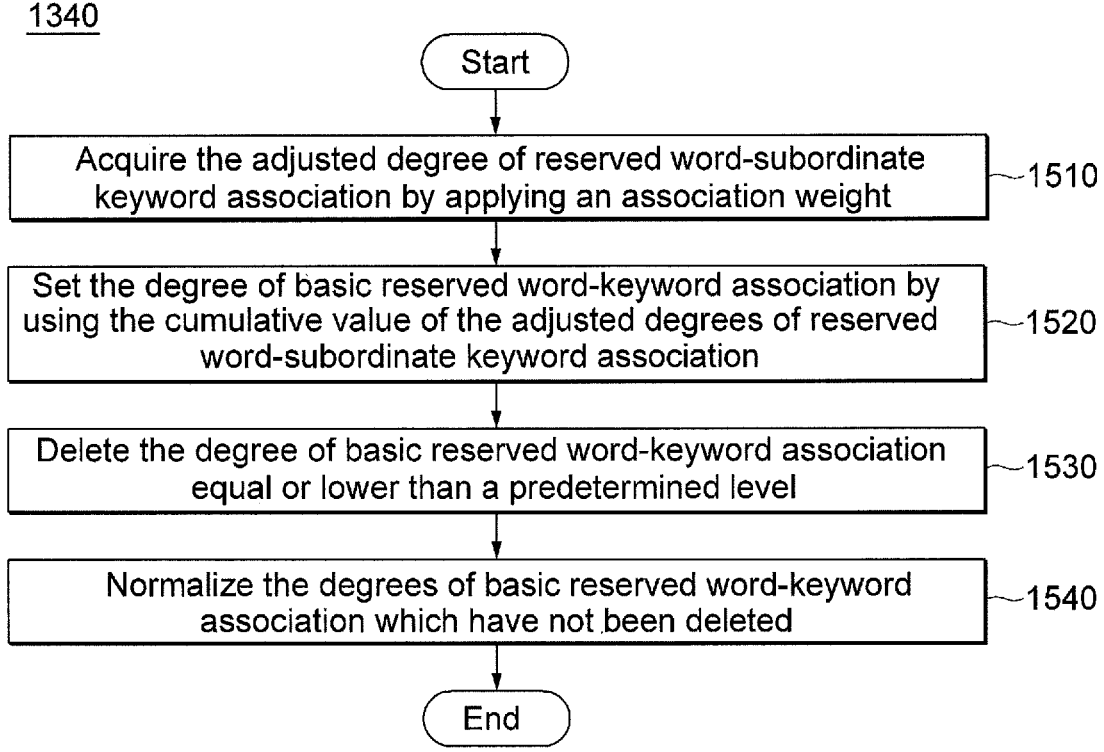
FIG. 17 is a detailed flowchart of step 1340 according to still another exemplary embodiment of the present disclosure.

FIG. 17 is a detailed flowchart of step 1340 according to still another exemplary embodiment of the present disclosure.

Since the processes of steps 1510 and 1520 of FIG. 17 are the same as the processes described with reference to FIG. 15, redundant descriptions will be omitted. Furthermore, since the process of step 1530 of FIG. 17 is the same as the processes described with reference to FIG. 16, a redundant description will be omitted.

At step 1540, the control unit 320 may normalize the degrees of basic reserved word-keyword association which have not been deleted and remain. For example, in order to include the average value of the degrees of basic reserved word-keyword association, stored in connection with a specific representative attribute keyword, in a specific range, the degrees of basic reserved word-keyword association stored in connection with the specific representative attribute keyword may be increased or decreased by multiply the degrees of basic reserved word-keyword association by a predetermined coefficient. For example, in order to include the total sum of the degrees of basic reserved word-keyword association stored in connection with a specific representative attribute keyword in a specific range, the degrees of basic reserved word-keyword association stored in connection with the specific representative attribute keyword may be increased or decreased by multiplying the degrees of basic reserved word-keyword association by a predetermined coefficient. In other words, appropriate adjustment may be performed to prevent a case where only a specific representative attribute keyword is recommended/used or the specific representative attribute keyword is rarely used even when any reserved word is selected because the degree of basic reserved word-keyword association having a high value is concentrated on the specific representative attribute keyword.

According to another exemplary embodiment, at step 1540, the control unit 320 may perform normalizing by adding a predetermined coefficient to the degrees of basic reserved word-keyword association or applying a combination with an arithmetic operation, such as a log operation, an exponential operation, or the like in place of multiplying them by the predetermined coefficient. According to still another exemplary embodiment, the control unit 320 may perform normalizing in such a manner as to decrease only the degrees of basic reserved word-keyword association equal to or higher than a specific reference value or increase only the degrees of basic reserved word-keyword association equal to or lower than a specific reference value.

Furthermore, according to another exemplary embodiment, at step 1540, the control unit 320 may perform normalization in order to include the average value (or the total sum) of the degrees of basic reserved word-keyword association stored in connection with a specific reserved word in a specific range.

There may be possible a modified exemplary embodiment in which step 1530 is omitted in the process of FIG. 17 and the normalization of the degrees of basic reserved word-keyword association is performed.

At step 1350, the communication unit 310 acquires a received reserved word by receiving the received reserved word from the terminal 200, and transfers the received reserved word to the control unit 320.

The received reserved word is a reserved word which is received by the terminal 200 from a search user. The terminal 200 may convert a voice input into an electrical signal (a voice signal), and may transfer information to the provision device 300. The control unit 320 of the information provision apparatus 300 may convert the voice signal into a text by analyzing the voice signal, and may match the resulting text to a reserved word. Furthermore, the control unit 320 may analyze the intonation, pitch, tempo, respiration state, etc. of a voice by analyzing the voice signal, and may use analysis results as contextual information.

According to another exemplary embodiment, the terminal 200 may convert the voice input into a text, and may transfer the text to the information provision apparatus 300. The terminal 200 may analyze the intonation, pitch, tempo, respiration state of a voice, etc., and may transfer analysis information to the information provision apparatus 300. The information provision apparatus 300 may use the analysis information as a type of contextual information.

At step 1360, the control unit 320 acquires the degree of reserved word-object association corresponding to a pair of the received reserved word and each object item by using the degree of object-keyword association and the degree of basic reserved word-keyword association. The process of step 1360 may be performed according to the method of step 940 of FIG. 9 or the method of FIG. 12. The same descriptions will be omitted.

At step 1370, the control unit 320 may provide an object item according to the degree of reserved word-object association corresponding to the received reserved word. The process of step 1370 may be performed in the same manner as the process of step 950. The same descriptions will be omitted.

Figure 14:
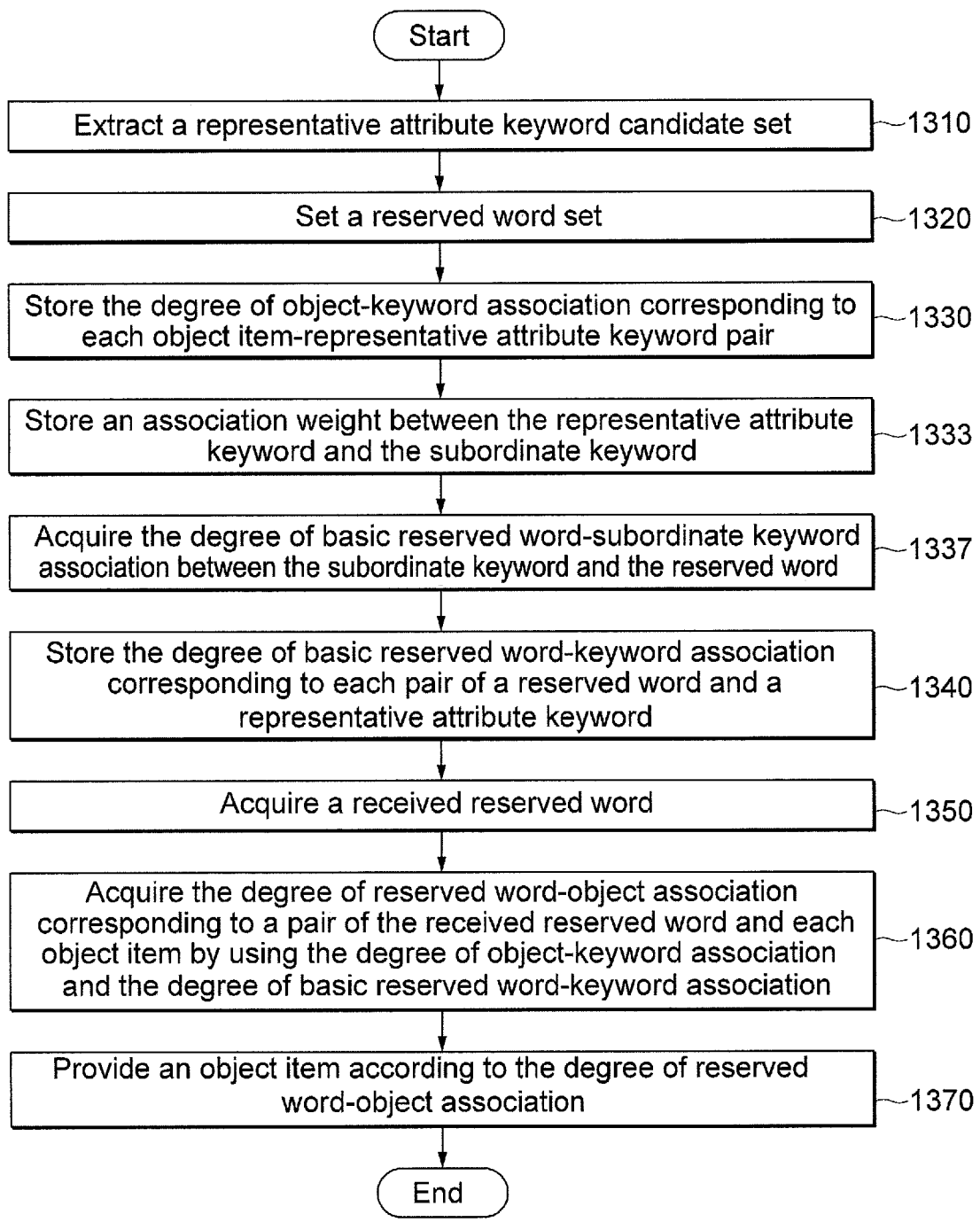
FIG. 14 is a flowchart of a process of providing information according to still another exemplary embodiment of the present disclosure.

FIG. 14 is a flowchart of a process of providing information according to still another exemplary embodiment of the present disclosure.

Since steps 1310, 1320, 1330, 1340, 1350, 1360 and 1370 of FIG. 14 are the same as steps 1310, 1320, 1330, 1340, 1350, 1360 and 1370 of FIG. 13, the same description will not be repeated.

Step 1333 added to FIG. 14 may be performed at any time after a representative attribute keyword and a subordinate keyword have been determined. For example, step 1333 may be performed at the same time as/in parallel with step 1330, or may be performed during step 1330.

At step 1333, the control unit 320 stores an association weight between the representative attribute keyword and the subordinate keyword. In the case where the process of setting an association weight is not performed at step 1330, an association weight between the representative attribute keyword and the subordinate keyword may be set through a process identical or similar to the process of step 530 of FIG. 5. According to another exemplary embodiment, the control unit 320 may store an association weight between the representative attribute keyword and the subordinate keyword in such a manner as to retrieve the association weight set at step 1330.

At step 1337, the control unit 320 acquires the degree of basic reserved word-subordinate keyword association between the subordinate keyword and the reserved word.

The control unit 320 may determine the degree of association between the reserved word and the subordinate keyword, e.g., by taking into account the frequency at which the subordinate keyword appears in a context identical or similar to a context in which the reserved word appears. For example, words appearing in the vicinity of keyword A in a specific sentence may be viewed as appearing in the vicinity of words associated with the keyword A in other documents.

"I went on a trip after making a hard decision, but it was July and, thus, the weather was so hot that I suffered."

"I went on a trip after making a hard decision, but it was July and, thus, the weather was so humid that I suffered."

Referring to the above two sentences, the word "hot" is replaced with the word "humid" in the same context. The control unit 320 may infer that "hot" and "humid" are associated words.

"I went on a trip after making a hard decision, but it was July and, thus, the weather was so hot that I suffered."

"I went on vacation after making a hard decision, but it was July and, thus, the weather was so hot that I suffered."

In the same manner, the control unit 320 may infer from the above two sentences that "trip" and "vacation" are associated words.

"I went on a trip after making a hard decision, but it was July and, thus, the weather was so hot that I suffered."

"I went on a trip after making a hard decision, but it was August and, thus, the weather was so hot that I suffered."

In the same manner, the control unit 320 may infer that "July" and "August" are associated words.

The control unit 320 may stores information in which "hot" and "humid" are associated words, "July" and "August" are associated words, and "trip" and "vacation" are associated words via previously collected documents. Thereafter, it is assumed that the following sentences are collected.

"I went on vacation after making a hard decision, but it was July and, thus, the weather was so hot that I suffered."

"I went on a trip after making a hard decision, but it was August and, thus, the weather was so hot that I went through hardship."

When the two sentences do not have the same context but it is known that "hot" and "humid" are associated words, "July" and "August" are associated words, and "trip" and "vacation" are associated words, the control unit 320 may learn via the above sentences that "suffer" and "hardship" are also associated words.

It may be determined that a keyword pair having a high appearing frequency in the same/similar contexts has a high degree of association. Furthermore, it is determined that the higher the similarity between contexts in which two keywords appear is, the higher the degree of association between the two keywords is. The control unit 320 may increase the accuracy of the determination of the degrees of association between keywords in such a manner as to set the degrees of association keywords by performing learning by using collected documents and then setting the degrees of association between keywords appearing in a corresponding sentence by using the set degrees of association between keywords and the context of the sentence.

As similar learning methods, Neural Net Language Model (NNLM), Recurrent Neural Net Language Model (RNNLM), word2vec, skipgram, and Continuous Bag-of-Words (CBOW) methods are known. In particular, when the word2vec method is used, the word2vec method may map individual keywords to vectors by performing learning by using documents, and may determine the similarity between two keywords through the cosine similarity computation of two vectors.

Figure 20:
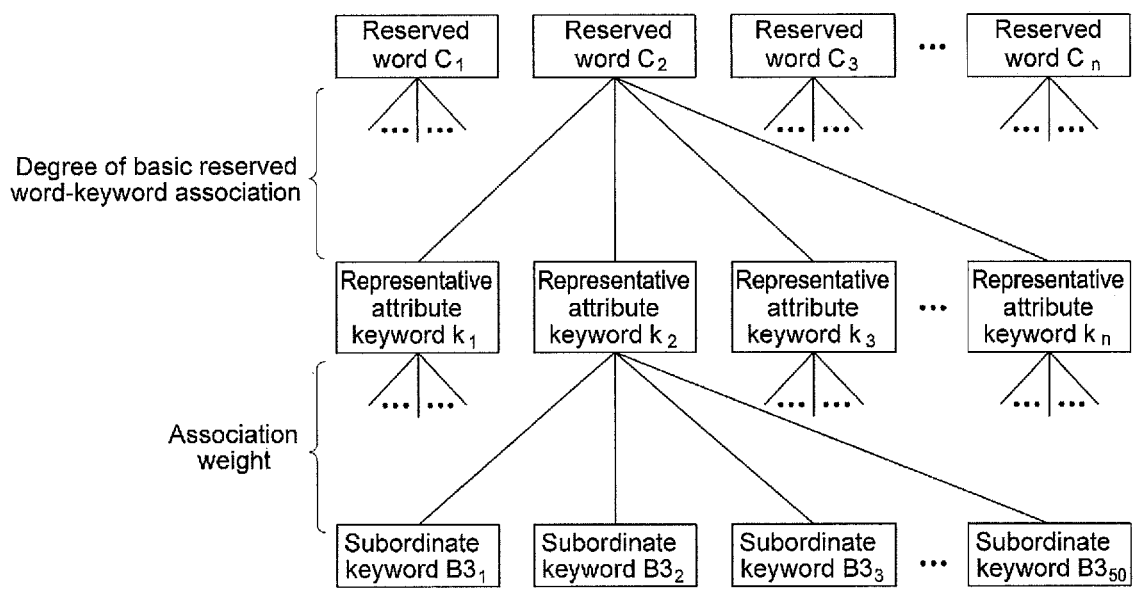
FIG. 20 is a view of a terminology hierarchy according to an exemplary embodiment of the present disclosure.

FIG. 20 is a view of a terminology hierarchy according to an exemplary embodiment of the present disclosure.

Once the process of FIG. 13 or 14 has been completed, there are set the hierarchical relationship between reserved words $C_1$ to $C_q$, representative attribute keywords $k_1$ to $k_n$, and subordinate keywords $BX_1$ to $BX_{50}$.

The degrees of basic reserved word-keyword association are set between the reserved words and the representative attribute keywords, and association weights are set between the representative attribute keywords and the subordinate keywords. Using this hierarchical relationship, the control unit 320 may perform the operation of recommending an appropriate object according to a reserved word, the operation of selecting a new reserved word candidate, or the like. Furthermore, the hierarchical relationship of FIG. 20 may be amended or improved by learning through the repetition of the process of FIG. 13 or 14, with new data being incorporated into the hierarchical relationship.

According to at least some exemplary embodiments of the present disclosure, there are provided a method and apparatus for efficiently providing information by using a reserved word.

In this case, it can be understood that individual blocks of the flowcharts and/or combinations of the blocks of the flowcharts may be performed by computer program instructions. Since it is possible to install these computer program instructions on a general-purpose computer, a special computer, or the processor of a programmable data processing device, the instructions executed through the computer or the processor of the programmable data processing device generate a means for performing functions which are described in the blocks of the flowcharts. Furthermore, since it is possible to store these computer program instructions in computer-usable or computer-readable memory that can be oriented to a computer or some other programmable data processing device in order to implement functions in a specific manner, it is possible to manufacture products in which instructions stored in computer-usable or computer-readable memory include means for performing functions described in the blocks of flowcharts. Moreover, since it is possible to install computer program instructions on a computer or another programmable data processing device, instructions for performing a series of operational steps on the computer or the programmable data processing device, generating processes executed by the computer and operating the computer or the programmable data processing device can provide steps for performing functions described in the blocks of flowcharts.

Furthermore, each block may refer to part of a module, a segment, or code including one or more executable instructions for performing one or more specific logical functions. Moreover, it should be noted that in some alternative embodiments, functions described in blocks may occur out of order. For example, two successive blocks may be actually performed at the same time, or sometimes may be performed in reverse order according to relevant functions.

In this case, the term "unit" used herein refers to a software or hardware component, such as an FPGA or ASIC, which performs a function. However, the term "unit" is not limited to a software or hardware component. The unit may be configured to be stored in an addressable storage medium, or may be configure to run one or more processors. For example, the unit may include components, such as software components, object-oriented software components, class components and task components, processes, functions, attributes, procedures, subroutines, segments of program codes, drivers, firmware, microcode, circuits, data, databases, data structures, tables, arrays, and variables. Functions provided by components and units may be combined into a smaller number of components and units, or may be divided into a larger number of components and units. Furthermore, components and units may be each implemented to run one or more CPUs within a device or security multimedia card.

It will be understood by those having ordinary knowledge in the art to which the present disclosure pertains that the present disclosure may be practiced in other specific forms without changing the technical spirit or essential feature of the present disclosure. Therefore, the above-described embodiments should be understood as being illustrative, not limitative, in all aspects. The scope of the present disclosure is defined based on the attached claims rather than the detailed description, and the claims, equivalents to the claims, and all modifications and alterations derived from the claims and the equivalents should be construed as being included in the scope of the present disclosure.

Meanwhile, although the exemplary embodiments of the present disclosure have been disclosed in the present specification and the accompanying drawings and the specific terms have been used, this is intended merely to easily describe the technical spirit of the present disclosure and help to understand the present disclosure, but is not intended to limit the scope of the present disclosure. It will be apparent to those having ordinary knowledge in the art to which the present invention pertains that other modified exemplary embodiments based on the technical spirit of the present invention may be implemented in addition to the disclosed exemplary embodiments.

What is claimed is:

1. A method of providing information for providing an object item for a received reserved word by an information providing device, the method comprising:
   extracting a representative attribute keyword candidate set including a representative attribute keyword;
   setting a reserved word set including a basic reserved word preset by an administrator and expressed by degrees of association of the representative attribute keyword;
   storing degrees of object-representative attribute keyword association corresponding to object item-representative attribute keyword pairs consisting of the object item and the representative attribute keyword that modifies or describes the object item;
   storing degrees of basic reserved word-representative attribute keyword association corresponding to basic reserved word-representative attribute keyword pairs by using association weights corresponding to representative attribute keyword-subordinate keyword pairs and degrees of basic reserved word-subordinate keyword association corresponding to basic reserved word-subordinate keyword pairs;
   acquiring a received reserved word input by a user terminal;
   acquiring a degree of received reserved word-object association corresponding to a pair of the received reserved word and each object item by using the degrees of object-representative attribute keyword association and the degrees of basic reserved word-representative attribute keyword association; and
   providing an object item based on the degree of received reserved word-object association corresponding to the pair of the received reserved word and each object item,
   wherein, before the step of storing the degrees of basic reserved word-representative attribute keyword association, a subordinate keyword, the association weight corresponding to the pair of the representative attribute keyword and the subordinate keyword, and the degree of basic reserved word-subordinate keyword association corresponding to the pair of the reserved word and the subordinate keyword are each determined, and
   wherein the step of storing the degrees of basic reserved word-representative attribute keyword association comprises determining and storing the degrees of association between the object item and the representative attribute keyword based on a pre-selected document set by an administrator terminal.

2. The method of claim 1, further comprising, before the step of storing the degrees of basic reserved word-representative attribute keyword association:
   storing the association weights corresponding to the representative attribute keyword-subordinate keyword pairs; and
   acquiring the degrees of basic reserved word-subordinate keyword association between each subordinate keyword corresponding to the representative attribute keywords and the basic reserved words.

3. The method of claim 2, wherein the step of acquiring the degrees of basic reserved word-subordinate keyword association comprises:
   determining the degrees of basic reserved word-subordinate keyword association between each subordinate keyword and the basic reserved words by taking into account a frequency at which each subordinate keyword appears in a context identical or similar to a context in which the basic reserved words appear.

4. The method of claim 1, wherein the step of storing the degrees of basic reserved word-representative attribute keyword association comprises:
   acquiring adjusted degrees of basic reserved word-subordinate keyword association corresponding to the basic reserved word-subordinate keyword pairs for the representative attribute keywords by applying the association weights corresponding to the representative attribute keyword-subordinate keyword pairs to the degrees of basic reserved word-subordinate keyword association corresponding to the reserved word-subordinate keyword pairs for each basic reserved word-subordinate keyword pair; and
   setting the degrees of basic reserved word-representative attribute keyword association corresponding to pairs of the basic reserved words and a specific representative attribute keyword so that the degrees of basic reserved word-keyword association pair have a positive correlation with a cumulative value of the adjusted degrees of basic reserved word-subordinate keyword association for the specific representative attribute keyword.

5. The method of claim 4, wherein the step of acquiring the adjusted degrees of basic reserved word-subordinate keyword association comprises:
   acquiring the adjusted degree of basic reserved word-subordinate keyword association corresponding to each basic reserved word-subordinate keyword pairs for the representative attribute keywords by using a value obtained by multiplying the degrees of basic reserved word-subordinate keyword association corresponding to the basic reserved word-subordinate keyword pairs for each basic reserved word-subordinate keyword pair by the association weights corresponding to the representative attribute keyword-subordinate keyword pairs.

6. The method of claim 4, wherein the step of storing the degrees of basic reserved word-representative attribute keyword association further comprises:
   deleting a degree of basic reserved word-representative attribute keyword association for a representative attribute keyword, for which a degree of basic reserved word-representative attribute keyword association of a pair of a specific reserved word and a corresponding representative attribute keyword is equal to or lower than the reference degree of basic reserved word-keyword association, among representative attribute keywords having the degrees of basic reserved word-representative attribute keyword association corresponding to the specific reserved word.

7. The method of claim 4, wherein the step of storing the degrees of basic reserved word-representative attribute keyword association further comprises:

deleting degrees of basic reserved word-representative attribute keyword association for representative attribute keywords exclusive of a predetermined number of representative attribute keywords, selected in descending order of degrees of basic reserved word-representative attribute keyword association of pairs of a specific reserved word and the corresponding representative attribute keywords, from representative attribute keywords corresponding to the specific reserved word.

8. The method of claim 6 or 7, wherein the step of storing the degrees of basic reserved word-representative attribute keyword association further comprises:

normalizing not deleted ones of the degrees of basic reserved word-representative attribute keyword association corresponding to the specific reserved word so as to complement the degrees of basic reserved word-representative attribute keyword association.

9. The method of claim 1, wherein the step of setting the reserved word set including the basic reserved word comprises:

setting a reserved word candidate by taking into account a frequency at which one linguistic means or two or more consecutive linguistic means in documents included in a document set and a frequency at which an emotional word included in an emotional word dictionary is located within a preset distance from the one linguistic means or the two or more consecutive linguistic means;

providing interface information adapted to generate a reserved word selection interface including information about the set reserved word candidate; and when a reserved word selection input is received via the reserved word selection interface, adding the reserved word candidate, selected according to the selection input, to the reserved word set.

\* \* \* \* \*